US010915166B2

(12) United States Patent
Ishii et al.

(10) Patent No.: US 10,915,166 B2
(45) Date of Patent: Feb. 9, 2021

(54) SIMULATION SYSTEM, PROCESSING METHOD, AND INFORMATION STORAGE MEDIUM

(71) Applicant: BANDAI NAMCO ENTERTAINMENT INC., Tokyo (JP)

(72) Inventors: Yoshiaki Ishii, Sagamihara (JP); Shinya Making, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/245,598

(22) Filed: Jan. 11, 2019

(65) Prior Publication Data

US 2019/0220087 A1 Jul. 18, 2019

Related U.S. Application Data

(63) Continuation of application No. PCT/JP2017/024792, filed on Jul. 6, 2017.

(30) Foreign Application Priority Data

Jul. 13, 2016 (JP) .................................. 2016-138927

(51) Int. Cl.
*G06F 3/147* (2006.01)
*G06F 3/01* (2006.01)
(Continued)

(52) U.S. Cl.
CPC .............. *G06F 3/012* (2013.01); *A63B 69/18* (2013.01); *A63F 13/212* (2014.09); *A63F 13/25* (2014.09);
(Continued)

(58) Field of Classification Search
CPC .......... G06F 3/012; G06F 3/01; G06F 3/0481; G06F 3/0147; A63F 13/212; A63F 13/25;
(Continued)

(56) References Cited

U.S. PATENT DOCUMENTS 4,477,913 A 10/1984 Koya et al.
5,662,523 A 9/1997 Yasumaru et al.
(Continued)

FOREIGN PATENT DOCUMENTS

| JP | H11-309269 A | 11/1999 |
| JP | 2003-066825 A | 3/2003 |
| JP | 2015-064868 A | 4/2015 |

OTHER PUBLICATIONS

Aug. 29, 2017 International Search Report issued in International Patent Application No. PCT/JP2017/024793.
(Continued)

*Primary Examiner* — Robert J Michaud
(74) *Attorney, Agent, or Firm* — Oliff PLC

(57) ABSTRACT

A simulation system includes a processor including hardware. The processor is configured to perform: acquiring tracking information for point-of-view information about a user wearing an HMD; moving a moving body, corresponding to the user, in a virtual space; controlling a virtual camera set as a first person point-of-view of the user; and generating an image as viewed from the virtual camera in the virtual space, as a display image on the HMD. The processor is configured to perform, in controlling the virtual camera, setting the virtual camera so that a position and/or an orientation of the virtual camera is changed based on the tracking information, but orientation change of the virtual camera corresponding to at least one of pitching and rolling is disabled or limited in a case where a traveling direction of the moving body changes.

24 Claims, 20 Drawing Sheets

(51) Int. Cl.

| | | |
|---|---|---|
| *A63F 13/525* | (2014.01) | |
| *A63F 13/807* | (2014.01) | |
| *A63F 13/25* | (2014.01) | |
| *G06F 3/0481* | (2013.01) | |
| *A63F 13/212* | (2014.01) | |
| *G06T 19/00* | (2011.01) | |
| *A63F 13/57* | (2014.01) | |
| *G06T 7/73* | (2017.01) | |
| *A63B 69/18* | (2006.01) | |
| *G02B 27/01* | (2006.01) | |
| *A63F 13/211* | (2014.01) | |
| *A63B 71/06* | (2006.01) | |

(52) U.S. Cl.
CPC ............ *A63F 13/525* (2014.09); *A63F 13/57* (2014.09); *A63F 13/807* (2014.09); *G02B 27/017* (2013.01); *G06F 3/01* (2013.01); *G06F 3/0481* (2013.01); *G06F 3/147* (2013.01); *G06T 7/73* (2017.01); *G06T 19/00* (2013.01); *A63B 2071/0644* (2013.01); *A63F 13/211* (2014.09); *A63F 2300/8041* (2013.01); *G02B 2027/0187* (2013.01)

(58) Field of Classification Search
CPC ...... A63F 13/525; A63F 13/57; A63F 13/807; G06T 7/73; G06T 19/73
See application file for complete search history.

(56) References Cited

U.S. PATENT DOCUMENTS

| | | |
|---|---|---|
| 5,707,237 A | 1/1998 | Takemoto et al. |
| 5,921,780 A | 7/1999 | Myers |
| 6,010,403 A | 1/2000 | Adam et al. |
| 6,417,856 B1 | 7/2002 | Tamura et al. |
| 6,632,138 B1 | 10/2003 | Serizawa et al. |
| 6,752,716 B1 | 6/2004 | Nishimura et al. |
| 7,126,607 B2 | 10/2006 | Emerson |
| 7,328,900 B2 | 2/2008 | Mamitsu et al. |
| 7,625,287 B2 | 12/2009 | Champagne et al. |
| 7,736,220 B2 | 6/2010 | Mori |
| 8,412,499 B2 | 4/2013 | Sizov |
| 9,179,619 B1 | 11/2015 | Hood |
| 9,418,568 B2 | 8/2016 | Welles et al. |
| 9,589,384 B1 | 3/2017 | Waggoner |
| 2007/0082742 A1 | 4/2007 | Takizawa et al. |
| 2010/0004097 A1 | 1/2010 | D'Eredita |
| 2011/0164044 A1 | 7/2011 | Huang |
| 2012/0094754 A1* | 4/2012 | Suzuki ................. G06T 19/006 463/30 |
| 2016/0005263 A1 | 1/2016 | Keilwert et al. |
| 2016/0225192 A1 | 8/2016 | Jones et al. |
| 2017/0076496 A1* | 3/2017 | Inomata ................. G06F 3/012 |
| 2017/0160793 A1 | 6/2017 | Perlin et al. |
| 2017/0228928 A1 | 8/2017 | Terahata |
| 2017/0228931 A1 | 8/2017 | Parker et al. |
| 2017/0358140 A1* | 12/2017 | Kohler .............. G02B 27/0093 |
| 2018/0193737 A1 | 7/2018 | Gohara |
| 2019/0220087 A1 | 7/2019 | Ishii et al. |
| 2019/0220089 A1 | 7/2019 | Kakizawa et al. |

OTHER PUBLICATIONS

U.S. Appl. No. 16/245,716, filed Jan. 11, 2019 in the name of Yoshiaki Ishii et al.
Jun. 25, 2020 Office Action issued in U.S. Appl. No. 16/245,716.

\* cited by examiner

⇒ GENERATE DISPLAY IMAGE OF HMD

⇒ GENERATE COMPETITION IMAGE, OBSERVATION IMAGE, OR DEMO IMAGE

SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2017/024792, having an international filing date of Jul. 6, 2017, which designated the United States, the entirety of which is incorporated herein by reference. Japanese Patent Application No. 2016-138927 filed on Jul. 13, 2016 is also incorporated herein by reference in its entirety.

BACKGROUND

The disclosure relates to a simulation system, a processing method, an information storage medium, and the like.

Simulation systems using head mounted displays (HMDs) have conventionally been known. The system enables a user wearing the HMD on his or her head to experience a virtual reality (VR) world by watching an image displayed on a screen of the HMD. Japanese Patent Application Publication No. 1999-309269 discloses an example of a conventional technique of such a simulation system.

In the simulation system using an HMD, an image as viewed from a virtual camera in a virtual space is displayed on the HMD. With such an image displayed on the HMD, a vast VR space spreads over the entire field of view of a user, whereby virtual reality felt by the user can be largely improved.

However, when a moving body such as a character corresponding to the user moves in the virtual space and the virtual camera moves accordingly, the display image on the HMD might largely change regardless of the intention of the user. For example, when the moving body such as the character moves on a bumpy course, the display image (video) on the HMD is massively shaken in a vertical direction and the like in accordance with bumps on the course. Such shaking of the display image results in a problem such as the user feeling 3D sickness and the like.

DESCRIPTION OF EXEMPLARY EMBODIMENTS

Figure 1:
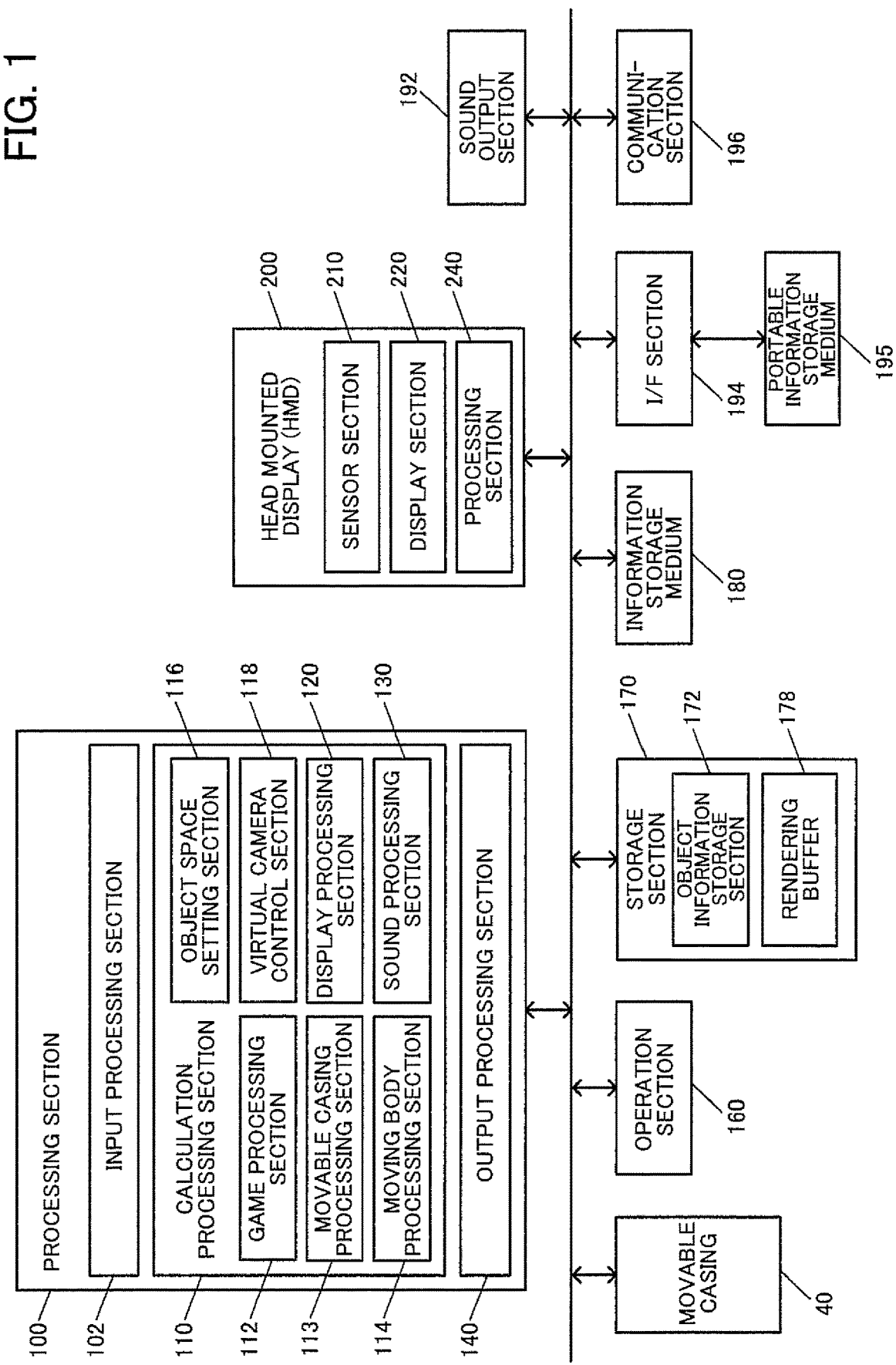
FIG. 1 is a block diagram illustrating a configuration example of a simulation system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, a simulation system, a processing method, an information storage medium, and the like with which a problem due to a display image being shaken and the like such as 3D sickness may be prevented can be provided.

In accordance with one of some embodiments, there is provided a simulation system comprising a processor including hardware, the processor being configured to perform:

an input process that acquires tracking information for point-of-view information about a user wearing a head mounted display;

a moving body process that is a process of moving a moving body, corresponding to the user, in a virtual space;

a virtual camera control process that controls a virtual camera set as a first person point-of-view of the user; and a display process of generating an image as viewed from the virtual camera in the virtual space, as a display image on the head mounted display, in the virtual camera control process, the processor performs setting the virtual camera so that a position and/or an orientation of the virtual camera is changed based on the tracking information, but orientation change of the virtual camera corresponding to at least one of pitching and rolling is disabled or limited in a case where a traveling direction of the moving body changes.

As a result, in some embodiments, the process of moving a moving body, corresponding to the user, in a virtual space is performed, and an image as viewed from the virtual camera set as the first person point-of-view of the user is generated as a display image on a head mounted display. The tracking information for the point-of-view information about the user wearing the head mounted display is acquired, and the position and/or the orientation of the virtual camera is changed based on the tracking information. At the same time, the orientation change of the virtual camera corresponding to pitching and/or rolling is disabled or limited in a case where the traveling direction of the moving body changes. With the position and/or the orientation of the virtual camera thus changed based on the tracking information for the point-of-view information about the user, a display image enhanced virtual reality can be displayed on the head mounted display. On the other hand, the orientation change of the virtual camera corresponding to pitching and/or rolling is disabled or limited in a case where the traveling direction of the moving body changes so that a risk of the problem due to the display image being shaken and the like such as 3D sickness can be reduced.

In accordance with one of some embodiments, there is provided the simulation system, wherein in the input process, the processor may perform acquiring the tracking information obtained through a tracking process on the head mounted display, the tracking information may include change information indicating a change in the point-of-view information from initial point-of-view information about the user.

As a result, in some embodiments, with this configuration where the tracking process for the head mounted display is performed and the change information indicating a change from the initial point-of-view information is acquired as the tracking information, the position and/or the orientation of the virtual camera can be changed in accordance with the point-of-view information about the user.

In accordance with one of some embodiments, there is provided the simulation system, wherein in the moving body process, the processor may perform a process of moving the moving body while disabling or limiting orientation change of the moving body corresponding to at least one of the pitching and rolling in a case where the traveling direction of the moving body changes, and in the virtual camera control process, the processor may perform setting the virtual camera at a point-of-view position of the moving body for which the orientation change is disabled or limited.

As a result, in some embodiments, with this configuration where the virtual camera is set to be at the point-of-view position of the moving body for which the orientation change corresponding to pitching and/or rolling is disabled or limited in a case where the traveling direction of the moving body changes, the orientation change of the virtual camera corresponding to pitching and/or rolling can be disabled or limited.

In accordance with one of some embodiments, there is provided a simulation system comprising a processor including hardware, the processor being configured to perform:

a moving body process that is a process of moving a moving body, corresponding to the user, in a virtual space;

a virtual camera control process that controls a virtual camera set as a first person point-of-view of the user; and a display process of generating an image as viewed from the virtual camera in the virtual space, as a display image, in the moving body process, the processor performs a process of moving the moving body while disabling or limiting orientation change of the moving body corresponding to at least one of pitching and rolling in a case where a traveling direction of the moving body changes, and in the virtual camera control process, the processor performs setting the virtual camera at a point-of-view position of the moving body for which the orientation change is disabled or limited.

As a result, in some embodiments, in accordance with one of some embodiments, the process of moving a moving body, corresponding to the user, in a virtual space is performed, and an image as viewed from the virtual camera set as the first person point-of-view of the user is generated as a display image. The virtual camera is set to be at the point-of-view position of the moving body for which the orientation change corresponding to pitching and/or rolling is disabled or limited in a case where the traveling direction of the moving body changes. The orientation change of the virtual camera corresponding to pitching and/or rolling can be disabled or limited, so that a risk of the problem due to the display image being shaken and the like such as 3D sickness can be reduced.

In accordance with one of some embodiments, there is provided the simulation system, wherein a process of moving a reference position of a local coordinate system for the moving body in a world coordinate system may be performed, the local coordinate system may be set so that rotational movement of the local coordinate system corresponding to at least one of pitching and rolling with respect to the world coordinate system is disabled or limited, and a point-of-view coordinate system for the virtual camera may be set at a point-of-view position of the moving body in the local coordinate system.

As a result, in some embodiments, with the coordinate system thus set, the virtual camera can be set to be at the point-of-view position of the moving body for which the orientation change corresponding to pitching and/or rolling is disabled or limited in a case where the traveling direction of the moving body changes.

In accordance with one of some embodiments, there is provided the simulation system, wherein in the moving body process, the processor may perform a process of moving the moving body on a course while disabling or limiting orientation change of the moving body corresponding to at least one of the pitching and rolling in a case where the traveling direction of the moving body changes due to a change in a status of the course in the virtual space, but changing an orientation of a given object accompanying the moving body in accordance with the status of the course.

As a result, in some embodiments, with this configuration, an unnatural image regarding an object accompanying the moving body can be prevented from being generated as a result of disabling or limiting the orientation change of the moving body corresponding to pitching and/or rolling.

In accordance with one of some embodiments, there is provided the simulation system, wherein
in the display process,
the processor may perform
generating, for a competition image, an observation image, or a demo image, an image displaying a second moving body for which the orientation change corresponding to at least one of the pitching and rolling is not disabled or limited.

As a result, in some embodiments, with this configuration, the competition image, the observation image, or the demo image is generated using a second moving body for which the orientation change corresponding to pitching and/or rolling is not disabled or limited, and thus can be prevented from being generated as an unnatural image.

In accordance with one of some embodiments, there is provided the simulation system, wherein
in the virtual camera control process,
the processor may perform
turning ON or OFF a process of disabling or limiting orientation change of the moving body corresponding to at least one of the pitching and rolling in accordance with whether or not a given condition is satisfied.

As a result, in some embodiments, with this configuration, the process of disabling or limiting the orientation change of the moving body corresponding to pitching and/or rolling can be turned ON or OFF in accordance with whether or not a given condition is satisfied.

In accordance with one of some embodiments, there is provided the simulation system, wherein
in the virtual camera control process,
the processor may perform
turning ON or OFF a process of disabling or limiting orientation change of the moving body corresponding to at least one of the pitching and rolling in accordance with a status of a course on which the moving body moves in the virtual space.

As a result, in some embodiments, with this configuration, the process of disabling or limiting the orientation change of the moving body corresponding to pitching and/or rolling can be turned ON or OFF in accordance with the status of the course on which the moving body moves.

In accordance with one of some embodiments, there is provided the simulation system, wherein
in the moving body process,
the processor may perform
performing a process of moving the moving body so that an orientation of the moving body changes in accordance with a change in the traveling direction of the moving body, and
in the virtual camera control process,
the processor may perform
setting the virtual camera to disable or limit orientation change of the virtual camera corresponding to at least one of the pitching and rolling in a case where the orientation of the moving body changes in accordance with a change in the traveling direction of the moving body.

As a result, in some embodiments, this configuration, a more natural image can be generated with the orientation of the moving body changing in accordance with a change in the traveling direction of the moving body, and a risk of 3D sickness and the like can be reduced with the orientation change of the virtual camera corresponding to pitching and/or rolling disabled or limited.

In accordance with one of some embodiments, there is provided the simulation system, wherein
in the moving body process,
the processor may perform
setting an orientation of the moving body with reference to at least one of the position and the orientation of the virtual camera.

As a result, in some embodiments, with this configuration, the orientation of the moving body can be set with reference to the position and/or the orientation of the virtual camera for which the orientation change corresponding to pitching and/or rolling is disabled or limited, whereby a more natural image can be generated.

In accordance with one of some embodiments, the simulation system may further comprise
a movable casing that changes a play position of the user in accordance with a change in the traveling direction of the moving body or in accordance with a status of a course on which the moving body moves.

As a result, in some embodiments, with this configuration where the play position of the user is changed by the movable casing, the user can feel a change in the traveling direction of the moving body or the status of the course, whereby a risk of 3D sickness and the like can further be reduced.

In accordance with one of some embodiments, there is provided the simulation system, wherein
the processor may be configured to perform
a sound process of generating sound corresponding to a change in the traveling direction of the moving body or generating output sound corresponding to a status of a course on which the moving body moves.

As a result, in some embodiments, with this configuration, the user can aurally recognize a change in the traveling direction of the moving body or the status of the course with a change in the output sound, whereby a risk of 3D sickness and the like can further be reduced.

In accordance with one of some embodiments, there is provided the simulation system, wherein
in the virtual camera control process,
the processor may perform
setting the process of disabling or limiting the orientation change of the virtual camera to be ON or OFF based on information set by the user or play history information about the user.

As a result, in some embodiments, with this configuration, the process of disabling or limiting the orientation change of the virtual camera corresponding to pitching and/or rolling can be set to be ON or OFF based on the setting information input by the user or past play history information about the user.

In accordance with one of some embodiments, there is provided a processing method comprising:
performing an input process that acquires tracking information for point-of-view information about a user wearing a head mounted display;

performing a moving body process that is a process of moving a moving body, corresponding to the user, in a virtual space;

performing a virtual camera control process that controls a virtual camera set as a first person point-of-view of the user; and performing a display process of generating an image as viewed from the virtual camera in the virtual space, as a display image on the head mounted display, in the virtual camera control process, performing setting the virtual camera so that a position and/or an orientation of the virtual camera is changed based on the tracking information, but orientation change of the virtual camera corresponding to at least one of pitching and rolling is disabled or limited in a case where a traveling direction of the moving body changes.

In accordance with one of some embodiments, there is provided a processing method comprising:

performing a moving body process that is a process of moving a moving body, corresponding to the user, in a virtual space;

performing a virtual camera control process that controls a virtual camera set as a first person point-of-view of the user; and performing a display process of generating an image as viewed from the virtual camera in the virtual space, as a display image, in the moving body process, performing a process of moving the moving body while disabling or limiting orientation change of the moving body corresponding to at least one of pitching and rolling in a case where a traveling direction of the moving body changes, and in the virtual camera control process, performing setting the virtual camera at a point-of-view position of the moving body for which the orientation change is disabled or limited.

Exemplary embodiments are described below. Note that the following exemplary embodiments do not in any way limit the scope of the content defined by the claims laid out herein. Note also that all of the elements described in the present embodiment should not necessarily be taken as essential elements 1. Simulation System FIG. 1 is a block diagram illustrating a configuration example of a simulation system (a simulator, a game system) according to the present embodiment. The simulation system according to the present embodiment is a system that simulates Virtual Reality (VR) for example, and can be applied to various systems such as a game system providing game contents, a real-time simulation system including a sports event simulator and a driving simulator, a content providing system that provides a content such as a movie, or an operating system for implementing a remote controlled operation. The simulation system according to the present embodiment is not limited to the configuration illustrated in FIG. 1, and can be modified in various ways including omitting some of its components (sections) or adding another component.

A movable casing 40 is a casing that changes a play position of a user and the like. For example, the movable casing 40 changes the play position of the user in accordance with a change in a traveling direction of a moving body or a status of a course on which the moving body moves. The movable casing 40 will be described in detail later.

Figure 6:
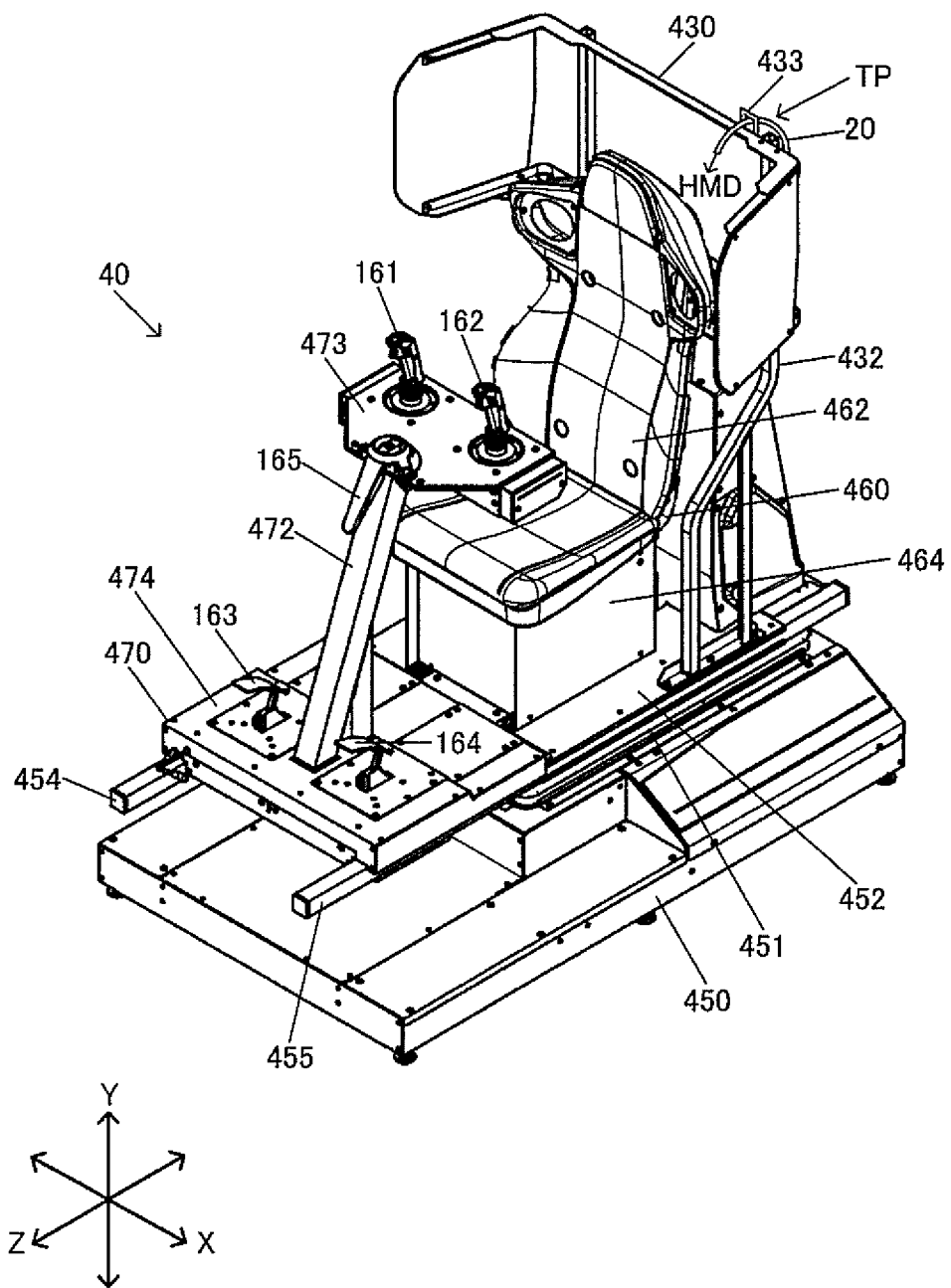
FIG. 6 illustrates a configuration example of a robot simulator as an example of the simulation system.

An operation section 160 is used by a user (player) to input various types of operation information (input information). The operation section 160 can be implemented by various operation devices such as an operation button, a direction designating key, a joystick, a handle, a pedal, and a lever for example. For example, in FIG. 4 described later, the operation section 160 is implemented with operation members 43 and 44, foot pedals 45 and 46, and the like. In FIG. 6, the operation section 160 is implemented with operation levers 161 and 162, an accelerator pedal 163, and a brake pedal 164.

A storage section 170 stores therein various types of information. The storage section 170 functions as a work area for a processing section 100, a communication section 196, and the like. The storage section 170 stores therein a game program and game data required for executing the game program. The function of the storage section 170 can be implemented by a semiconductor memory (dynamic random access memory (DRAM), video RAM (VRAM)), a hard disk drive (HDD), a solid state drive (SSD), an optical disc device, or the like. The storage section 170 includes an object information storage section 172 and a rendering buffer 178.

An information storage medium 180 (computer readable medium) stores therein a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. A modification where the HMD 200 is provided with a light emitting element may be employed. The sensor section 210 implements a tracking process such as head tracking for example. For example, the position and the direction of the HMD 200 are identified through the tracking process performed with the sensor section 210. With the position and the direction of the HMD 200 thus identified, a point-of-view position and a line-of-sight direction of the user can be identified.

Various tracking schemes can be employed. For a first tracking scheme as one example of the tracking scheme, a plurality of light receiving elements (such as photodiodes) are provided as the sensor section 210, as will be described in detail later with reference to FIG. 2A and FIG. 2B. With the plurality of light receiving elements receiving light (such as a laser beam) from a light emitting element (such as a light emitting diode (LED)) provided outside, a position and a direction of the HMD 200 (the head of the user) in a three-dimensional space of the real world are identified. For a second tracking scheme, the HMD 200 is provided with a plurality of light mitting elements (LEDs) as will be described in detail later with reference to FIG. 3A and FIG. 3B. The position and the direction of the HMD 200 are identified with an external image capturing section capturing an image with light from the plurality of light emitting elements. A third tracking scheme uses a motion sensor, provided to the sensor section 210, to identify the position and the direction of the HMD 200. For example, the motion sensor can be implemented with an acceleration sensor, a gyro sensor, or the like. For example, the position and the direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, or a combination of the first tracking scheme and the third tracking scheme. A tracking process of directly identifying the point-of-view position and line-of-sight direction of the user, instead of identifying the position and the direction of the HMD 200 to identify the point-of-view position and line-of-sight direction of the user, may be employed.

For example, the display section 220 of the HMD 200 can be implemented with a liquid crystal display (LCD), an organic electroluminescence (EL) display, or the like. For example, the display section 220 of the HMD 200 is provided as a first display set to be in front of the left eye of the user, and a second display set to be in front of the right eye of the user, whereby stereoscopic view can be implemented for example. The stereoscopic view is implemented with left-eye and right-eye images, with parallax, generated to be respectively displayed on the first and the second displays. Alternatively, the left-eye image and the right-eye image may be respectively displayed on the first and the second display areas of a single display.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a moving body process, a virtual camera control process, a display process, or sound process based on operation information from the operation section 160, tracking information about the HMD 200 (information about at least one of the position and direction of the HMD. information about at least one of the point-of-view position and the line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes a game processing section 112, a movable casing processing section 113, a moving body processing section 114, an object space setting section 116, a virtual camera control section 118, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the sensor section 210 of the HMD 200; a process of reading information, designated with a read command, from the storage section 170; and a process of receiving information from an external apparatus (such as a server) through a network. The receiving process includes a process of instructing the communication section 196 to receive information, acquiring the information received by the communication section 196, and writing the information to the storage section 170.

For example, the calculation processing section 110 performs various calculation processes For example, the calculation processes are performed for a game process (simulation process), a moving body process, a virtual camera control process, a display process, a sound process, or the like.

The game processing section 112 (a program module for a game process) performs various game processes for the user to play the game. In other words, the game processing section 112 (simulation processing section) performs various simulation processes to enable the user to experience virtual reality. Examples of the game process include a process of starting the game when a game start condition is satisfied, a process of making the started game progress, a process of ending the game when a game end condition is satisfied, and a process of calculating a game result.

The movable casing processing section 113 (a program module for a movable casing process) performs various processes for the movable casing 40 including, for example, a control process for the movable casing 40 and a detection process for various types of information for controlling the movable casing 40. For example, the movable casing processing section 113 performs a control process for air spring sections 50 to 53 illustrated in FIG. 4 described later. For example, a control process for extending/contracting the air spring sections 50 to 53 is performed. When a swing operation is performed with the operation members 43 and 44, or an edging operation is performed with the foot pedals 45 and 46, the movable casing processing section 113 performs a detection process for the resultant operation information, and performs the control process for the movable casing 40 and the like based on the operation information thus detected. The movable casing processing section 113 performs a control process for an electric cylinder (not illustrated) that changes the orientation (by pitching, rolling, and the like) of a base section 452 illustrated in FIG. 6. For example, a process of controlling a linear motion of a rod section of the electric cylinder is performed. The movable casing processing section 113 performs a detection process for operation information about the operation levers 161 and 162, the accelerator pedal 163, and the brake pedal 164 in FIG. 6, and performs a control process for the movable casing 40 and the like based on the operation information detected.

The moving body processing section 114 (a program module for a moving body process) performs various processes for a moving body that moves in a virtual space. For example, a process of moving the moving body in an object space (game space) that is a virtual space or a process of causing the moving body to make an action is performed. For example, the moving body processing section 114 performs a control process based on the operation information input by the user using the operation section 160, tracking information acquired, a program (movement/operation algorithm), and various types of data (motion data), and the like. The control process includes moving the moving body (model object) in the object space (virtual space) and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process.

For example, the moving body is a virtual user (virtual player) in a virtual space corresponding to the user (player) in the real space or a ridden moving body (operated moving body) ridden (operated) by the virtual user. For example, the moving body is a character (virtual user) that skies in the virtual space and corresponds to the user in a case of a ski simulator in FIG. 4 described later, or is a robot (ridden moving body) that is ridden by a character (virtual user) corresponding to the user in a case of a robot simulator in FIG. 6.

The object space setting section 116 (a program module for an object space setting process) performs a setting process for an object space (a virtual space in a broad sense) in which a plurality of objects are arranged. For example, a process of setting an arrangement of various objects (an object formed by a primitive surface such as a polygon, a free-form surface or a subdivision surface) representing various displayed objects such as a moving body (such as a person, a robot, a car, a train, an aircraft, a boat, a monster, or an animal), a map (terrain), a building, audience seats, a course (road), woods, a wall, and a water surface in the object space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a moving speed, a moving direction, and the like of an object (part object) in the virtual space. The object space setting section 116 performs a process of updating this object information on a frame by frame basis for example.

The virtual camera control section 118 (a program module for a virtual camera control process) performs a control process for a virtual camera (point-of-view, reference virtual camera) to generate an image as viewed from a given (any) point-of-view in the object space. For example, a process of controlling a position (point-of-view position) or an orientation (line-of-sight direction) of the virtual camera is performed. Specifically, a process (a process of controlling a point-of-view position, a line-of-sight direction, or an angle of view) of controlling the position (X, Y, Z) of the virtual camera and a rotational angle (a rotational angle about an X, Y, or Z axis) as orientation information is performed. The virtual camera corresponds to a point-of-view of the user (virtual user). When stereoscopic view is implemented, a left-eye first point-of-view (left-eye first virtual camera) and a right-eye second point-of-view (right-eye second virtual camera) are set.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220 of the HMD 200. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an α value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image in the object space (virtual space) as viewed from the virtual camera (a given point-of-view, a left-eye, right-eye, first, or second point-of-view) is generated. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the input processing section 102, the moving body processing section 114, the virtual camera control section 118, and the display processing section 120, as illustrated in FIG. 1.

The input processing section 102 (input reception section) acquires tracking information for point-of-view information about the user wearing the HMD 200 (head mounted display). For example, the input processing section 102 acquires tracking information (point-of-view tracking information) for point-of-view information that is at least one of the point-of-view position and the line-of-sight direction of the user. For example, the tracking information can be acquired by performing a tracking process for the HMD 200. The point-of-view position and the line-of-sight direction of the user may be directly acquired by the tracking process.

The moving body processing section 114 performs a process of moving the moving body (such as a virtual user or a ridden moving body) corresponding to the user, in the virtual space (object space). For example, the moving body processing section 114 performs a process of moving the moving body on a course and the like in the virtual space, by performing a process of obtaining information about the position and the direction of the moving body once in every predetermined period of time (in each frame for example). Furthermore, the moving body processing section 114 performs a process (motion process) of causing the moving body to make an action and the like.

For example, the virtual camera control section 118 controls the virtual camera set as a first person point-of-view (the point-of-view of the user in a broad sense) of the user. For example, the virtual camera is set to be at a position corresponding to the point-of-view of a moving body moving in the virtual space, and the point-of-view position and the line-of-sight direction of the virtual camera are set to control the position (position coordinates) and the orientation (a rotational angle about a rotation axis) of the virtual camera. The display processing section 120 generates an image as viewed from the virtual camera (user point-of-view) in the virtual space as a display image (display video) of the HMD 200. For example, an image as viewed from a given point-of-view in the object space as the virtual space is generated. The image generated is preferably a stereoscopic image.

The virtual camera control section 118 changes the position and the orientation of the virtual camera based on the tracking information (information about at least one of the point-of-view position and the line-of-sight direction of the user). For example, the virtual camera control section 118 sets the virtual camera so that the position (point-of-view position) and the orientation (line-of-sight direction) of the virtual camera changes in accordance with the change in the point-of-view position and the line-of-sight direction of the user in the real space.

For example, the virtual camera is set for the point-of-view (first person point-of-view) of the virtual user in the virtual space. When the point-of-view position and the line-of-sight direction of the user changes as a result of the user in the real space (real world) wearing the HMD 200 shaking his or her head or moving his or her body, the point-of-view position and the line-of-sight direction of the virtual user in the virtual space changes accordingly. Thus, when the point-of-view position and the line-of-sight direction of the user in the real space change, the position and the orientation of the virtual camera in the virtual space change accordingly. When the virtual user (character) or its ridden moving body (such as a robot, a train, a car, a motor cycle, a bicycle, an aircraft, or a ship) moves in the virtual space by the user operating the operation section 160, the position (the point-of-view position of the virtual user) of the virtual camera also changes to follow the movement. Thus, the user can experience virtual reality as if the virtual user as his or her avatar, or its ridden moving body is moving in the virtual space. The point-of-view of the virtual user in the virtual space is the first person point-of-view. An image as viewed from the first person point-of-view may include a body part of the virtual user (character) and what is going on inside the ridden moving body.

The virtual camera control section 118 further sets the virtual camera to disable or limit orientation change of the virtual camera corresponding to at least one of pitching and rolling in a case where the traveling direction of the moving body changes. For example, the orientation of the virtual camera is set so that the pitching and/or rolling does not occur in accordance with a change in the traveling direction of the moving body. For example, when the point-of-view position and/or the line-of-sight direction of the user in the real space changes, the position and/or the orientation of the virtual camera changes accordingly. However, the virtual camera is set not to perform pitching and/or rolling in accordance with the traveling direction of the moving body in a case where the traveling direction of the moving body changes. For example, the virtual camera is set so that a pitch angle and/or a roll angle does not change and thus is maintained at an initially set angle. For example, the virtual camera is set so that pitching (pitch angle) is in parallel with a plane (XZ plane) in a horizontal direction in the world coordinate system in the virtual space for example. The virtual camera is set so that the rolling (a roll angle) does not change from the vertical direction (Y axis) of the world coordinate system for example. The disabling of the orientation change corresponding to the pitching and/or rolling means that the orientation change corresponding to the pitching and/or rolling will not be performed. The limiting of the orientation change corresponding to the pitching and/or rolling means that the orientation change corresponding to the pitching and/or rolling will be performed but with a rotational angle (sufficiently small rotational angle) smaller than the rotational angle of the pitching and/or rolling corresponding to the traveling direction of the moving body.

The orientation of the virtual camera can be defined by a vector of the line-of-sight direction of the virtual camera and a vector of an upward direction of the virtual camera (a vector indicating which direction is the upward direction of the virtual camera). The vector of the line-of-sight direction can be set based on a gaze position of the virtual camera. For example, orientation change (rotational movement) corresponding to pitching and/or yawing of the virtual camera can be implemented by changing the vector of the line-of-sight direction of the virtual camera. For example, the orientation change (rotational movement) corresponding to rolling of the virtual camera can be implemented by changing the vector of the upward direction of the virtual camera.

The input processing section 102 acquires tracking information obtained by the tracking process for the HMD 200. For example, tracking information for identifying the point-of-view information that is at least one of the point-of-view position and the line-of-sight direction of the user is acquired through the tracking process for the HMD 200 as illustrated in FIG. 2A to FIG. 3B described later. The tracking information includes change information indicating a change of the point-of-view information from initial point-of-view information of the user. For example, the tracking information includes at least one of: change information (a value indicating a change in coordinates of the point-of-view position) indicating a change of the point-of-view position from the initial point-of-view position of the user; and change information (a value indicating a change in the rotational angle of the line-of-sight direction about the rotation axis) indicating a change of the line-of-sight direction from the initial line-of-sight direction of the user. Based on the change information about the point-of-view information included in such tracking information, the point-of-view position and/or the line-of-sight direction of the user can be identified.

The moving body processing section 114 performs a process of moving a moving body while disabling or limiting orientation change of the moving body corresponding at least one of pitching and rolling in a case where the traveling direction of the moving body changes. For example, when the traveling direction of the moving body moving on a course or the like is changed, a model object of the moving body is set to be arranged at a position as the destination of the movement, without causing the orientation change of the moving body corresponding to the pitching and/or rolling. Then, the virtual camera control section 118 sets the virtual camera to be at the position of the point-of-view of the moving body for which the orientation change is disabled or limited. For example, the virtual camera is set to be arranged at the position of the first person point-of-view of the moving body corresponding to the virtual user. This configuration disables or limits the orientation change of the virtual camera corresponding to at least one of the pitching and rolling in a case where the traveling direction of the moving body changes.

Specifically, in this case, a process of moving a reference position of the local coordinate system for the moving body in the world coordinate system is performed for example. The reference position of the local coordinate system is the origin position for example, and the moving body is set to be arranged to have a predetermined position (for example, a foot position, a waist position, or the like described later) arranged at the origin position of the local coordinate system. The local coordinate system is set to disable or limit rotational movement corresponding to at least one of the pitching and rolling of the local coordinate system relative to the world coordinate system. The point-of-view coordinate system (the origin of the point-of-view coordinate system) for the virtual camera is set to be at the point-of-view position of the moving body in the local coordinate system.

The method of controlling the orientation of the virtual camera in the method of moving the moving body while disabling or limiting the orientation change of the moving body corresponding to pitching and/or rolling in a case where the traveling direction of the moving body changes, is not limited to the method described above. The image may be projected by a projection device on a projection screen, instead of being displayed on the HMD 200. The projection screen is a screen including a single curved surface or a plurality of surfaces, and is a curved screen that is known as a dome shaped screen for example.

The orientation of the moving body can be defined by a rotational angle of the moving body (model object) about each of a plurality of rotation axes (X axis, Y axis, and Z axis). The orientation change of the moving body corresponds to rotational movement about each rotation axis. For example, the orientation of the moving body can be defined by the rotational angle of the moving body about each rotation axis of the local coordinate system with respect to the world coordinate system, and can be represented by a rotation matrix for the coordinate conversion for example.

The moving body processing section 114 performs a process of moving the moving body on a course while disabling or limiting orientation change of the moving body corresponding to at least one of the pitching and rolling in a case where the traveling direction of the moving body changes due to a change in a status of the course in the virtual space. On the other hand, an orientation of a given object accompanying the moving body is changed in accordance with the shape of the course.

For example, course information corresponding to the course is stored in the storage section 170, and the moving body processing section 114 performs the process of moving the moving body based on the course information. For example, course information, such as height information and direction information about the course, is stored in association with each point on the course, and the moving body processing section 114 reads the course information about a point corresponding to the position of the moving body, to perform a process of moving the moving body in the traveling direction. For example, the traveling direction of the moving body is set so that the moving body moves in a downward direction in a downhill course, and moves in an upward direction in an uphill course. The traveling direction of the moving body is set so that the moving body moves in a rightward direction in a right curve course, and moves in a leftward direction in a left curve course. The process of moving the moving body is performed so that the orientation change of the moving body corresponding to the pitching and/or rolling is disabled (or limited) in a case where the traveling direction of the moving body thus changes. Even in such a case, the orientation is changed in accordance with the status (such as the shape) of the course, a for a given object (such as a ski board, a body part of a character as the moving body, and the like described later for example) accompanied by the moving body. For example, the orientation of the given object is changed to be along a downhill on a downhill course, and is changed to be along an uphill on an uphill course.

The display processing section 120 generates an image displaying a second moving body for which the orientation change corresponding to at least one of the pitching and rolling is not disabled or limited, for a competition image, an observation image, or a demo image. Thus, the competition image, the observation image, or the demo image is generated by using a moving body for which the orientation change is not disabled or limited. The competition image is an image used for competition. For example, the competition image is an image with which an opponent user as a competitor sees the moving body of the user, and is an image displayed on an HMD (display section) of the opponent user, for example. The observation image (watching image) is an image used for observation. For example, the observation image is an image for observing (watching) a game involving a movement of the moving body of the user. For example, the observation image is an image displayed on an observation monitor so that audiences can watch the game. The demo image is an image used for demos. For example, the demo image is an image displayed for demonstration before and/or after the game or at the other like timing. For example, information about a video showing a game (past gameplay) performed by using the moving body of the user is stored in the storage section 170, and the demo image is displayed by playing back the video or the like.

The virtual camera control section 118 turns ON or OFF the process of disabling or limiting the orientation change of the moving body corresponding to at least one of the pitching and rolling in accordance with whether or not a given condition is satisfied. For example, the mode (process) for disabling or limiting the orientation change is turned ON or OFF through selection by the user. Specifically, the user is enabled to turn ON or OFF the mode for disabling or limiting the orientation change on an option setting screen on which various setting for the game is performed. Alternatively, the virtual camera control section 118 may turn ON or OFF the process of disabling or limiting the orientation change of the moving body corresponding to at least one of the pitching and rolling, in accordance with the status of the course on which the moving body moves in the virtual space. For example, for a flat course, the process of disabling or limiting the orientation change is unnecessary and thus is turned OFF. Alternatively, the process of disabling or limiting the orientation change is turned OFF, under a status where the process results in an unnatural image such as a steep uphill. On the other hand, the process of disabling or limiting the orientation change is turned ON, under a course status requiring prevention of 3D sickness such as a bumpy course or a downhill course.

The moving body processing section 114 performs a process of moving the moving body so that the orientation of the moving body changes in accordance with a change in the traveling direction of the moving body. For example, the moving body is moved with the orientation changed to show the movement in the downward direction when the traveling direction is the downward direction, and is moved with orientation changed to show the movement in the upward direction when the traveling direction is the upward direction. Similarly, the moving body is moved with the orientation changed to show the movement of turning right and the movement of turning left respectively in cases where the traveling direction is turned right or left. Also in this case, the virtual camera control section 118 sets the virtual camera to disable or limit the orientation change of the virtual camera corresponding to at least one of the pitching and rolling in a case where the orientation of the moving body changes in accordance with a change in the traveling direction of the moving body. For example, orientation change of the virtual camera corresponding to pitching is disabled or limited also when the orientation of the moving body changes to the orientation corresponding to the downward direction or the upward direction as the traveling direction advancing in the downward direction or the upward direction. For example, the orientation change of the virtual camera corresponding to the pitching is disabled. For example, orientation change of the virtual camera corresponding to rolling is disabled or limited also when the orientation of the moving body changes to turn right or left with the traveling direction curving in the rightward direction or the leftward direction. For example, the orientation change of the virtual camera corresponding to the rolling is disabled.

In such a case, the moving body processing section 114 may set the orientation of the moving body with reference to at least one of the position and the orientation of the virtual camera. For example, the position and/or the orientation of the virtual camera for which the orientation change corresponding to rolling and/or pitching is disabled or limited is set. Then, the final orientation of the moving body is set with reference to the position and/or orientation of the virtual camera. For example, the position of the virtual camera is set to be at the point-of-view position of the moving body, and the orientation of the moving body is set so that a predetermined part (for example, a foot) of the moving body or an accompanying object (for example, a ski board) is in contact with the course. The orientation of the moving body can be thus set by performing an inverse kinematics process in the motion process or the like for example.

The simulation system according to the present embodiment may include the movable casing 40 that changes the play position of the user. The movable casing 40 changes the play position (the position and/or the orientation) of the user, in accordance with the change in the traveling direction of the moving body or the status (game status) of the course on which the moving body moves. The change in the play position by the movable casing 40 is implemented through a control process on the movable casing 40 by the movable casing processing section 113. For example, in FIG. 4 described later, the play position (PPL) is changed by using the air spring sections 50 to 53. In FIG. 6 described later, the play position of the user is changed by changing the orientation of the base section 452 with an electric cylinder (not illustrated).

For example, in the present embodiment, a virtual reality simulation process is performed as a game process for a game played by the user. The virtual reality simulation process is a simulation process simulating a real space event in the virtual space, and is for enabling the user to virtually experience the event. For example, a process of moving the moving body such as a virtual user corresponding to the user in the real space or its ridden moving body in the virtual space is performed for enabling the user to experience a change in an environment or surroundings due to the movement. The movable casing 40 changes the play position based on a result of the simulation process that is the game process. For example, the play position is changed based on a result of the process of moving the moving body in the virtual space or the like. For example, the movable casing 40 performs a process of changing the play position as a simulation process for enabling the user to feel the change (accelerated or decelerated) in acceleration due to the change in the traveling direction of the user. Alternatively, when the moving body moves on the course, the movable casing 40 performs a process of changing the play position as a simulation process for enabling the user to feel the ups and downs or bumpiness of the course. With the play position thus changed by the movable casing 40, movement of the display image on the HMD 200 is somewhat linked with the change in acceleration and the like felt by the user, whereby the 3D sickness and the like of the user can be suppressed.

The play position is a position of the user playing a virtual reality (VR) simulation game. For example, the play position is a ride position of the user on a ride section such as a seat. For example, when a virtual reality simulation game is played with the player seated on a seat serving as the ride section, the play position is a seated position which corresponds to the ride position for the seat for example. When the user is saddled on a ride section simulating a ride such as a motor cycle or a bicycle or an animal such as horse, the play position is the saddled position. In a simulation game played by the user in a standing posture, the play position is the standing position of the user for example.

The simulation system according to the present embodiment includes the sound processing section 130. The sound processing section 130 performs a process of generating sound corresponding to a change in the traveling direction of the moving body or generating output sound corresponding to the status of the course on which the moving body moves. For example, when the traveling direction of the moving body changes or the status of the course changes, the output sound for making a user recognize the change is generated. For example, for a bumpy course, a "rattling" sound is output so that the user can aurally recognize that the course is bumpy. When the traveling direction of the user suddenly changes, sound that makes the user recognize the change (accelerated or decelerated) in the acceleration involved in the change in the traveling direction is output, so that the user can aurally recognize the change in the traveling direction. Thus, a risk of making the user feel 3D sickness can be reduced.

The virtual camera control section 118 sets the process of disabling or limiting the orientation change of the virtual camera to be ON or OFF, based on information set by the user or play history information about the user. For example, the option setting screen for the user to input various types of setting information for the game enables the mode of disabling or limiting the orientation change of the virtual camera to be set to be ON or OFF. Alternatively, the process of disabling or limiting the orientation change of the virtual camera is set to be ON or OFF based on past play history information about the user. For example, the process is set to be ON for a user that has more frequently selected ON, and is set to be OFF for a user that has more frequently selected OFF. The play history information may be read from the portable information storage medium 195 held by the user or may be downloaded from a server based on identification information such as a user ID stored in the portable information storage medium 195.

2. Tracking Process

Figure 2A:
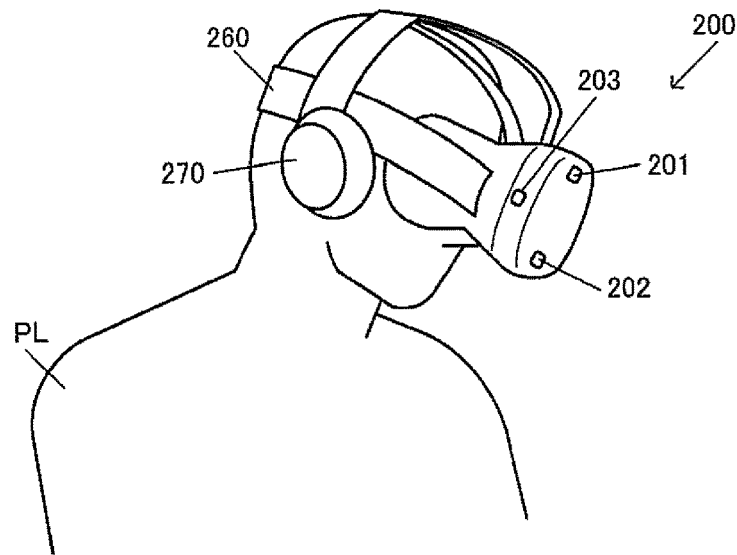
FIG. 2A and FIG. 2B illustrate an example of an HMD used in the present embodiment.

Next, an example of a tracking process will be described. FIG. 2A illustrates an example of the HMD 200 used in the simulation system in the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD.

The HMD 200 is provided with a headband 260 and the like so that that a user PL can stably wear the HMD 200 on his or her head with a better fitting comfort. The HMD 200 is provided with an unillustrated headphone terminal. The user PL can hear game sound as a result of a three-dimensional acoustic (three-dimensional audio) process for example, with a headphone 270 (sound output section 192) connected to the headphone terminal. The user may be enabled to input operation information through a head nodding or shaking action to be detected by the sensor section 210 of the HMD 200 and the like.

Figure 2B:
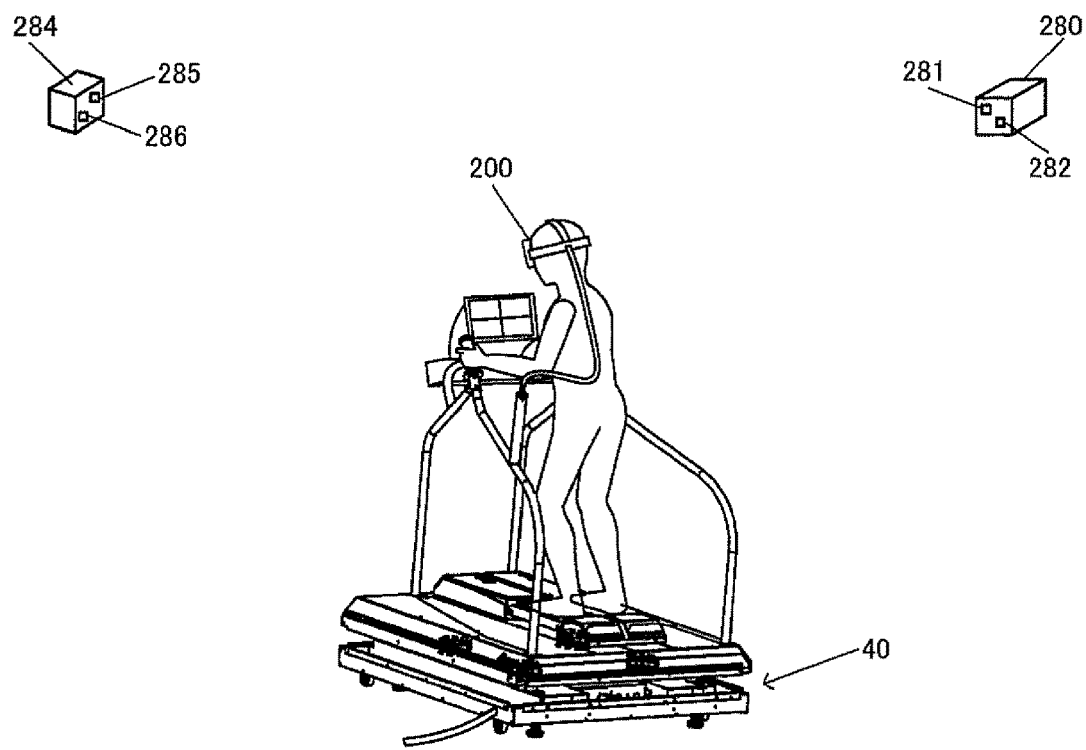

As illustrated in FIG. 2B, base stations 280 and 284 are installed in the periphery of the simulation system (movable casing 40). The base station 280 is provided with light emitting elements 281 and 282, and the base station 284 is provided with light emitting elements 285 and 286. For example, the light emitting elements 281, 282, 285, and 286 are implemented with LEDs that emit laser beams (such as infrared laser beams). The base stations 280 and 284 radially emit laser beams by using the light emitting elements 281, 282, 285, and 286, for example. With the light receiving element 201 to 203 provided to the HMD 200 in FIG. 2A and the like receiving the laser beams from the base stations 280 and 284, the tracking of the HMD 200 is implemented so that the position and the facing direction of the head of the user PL (point-of-view position, line-of-sight direction) can be detected.

Figure 3A:
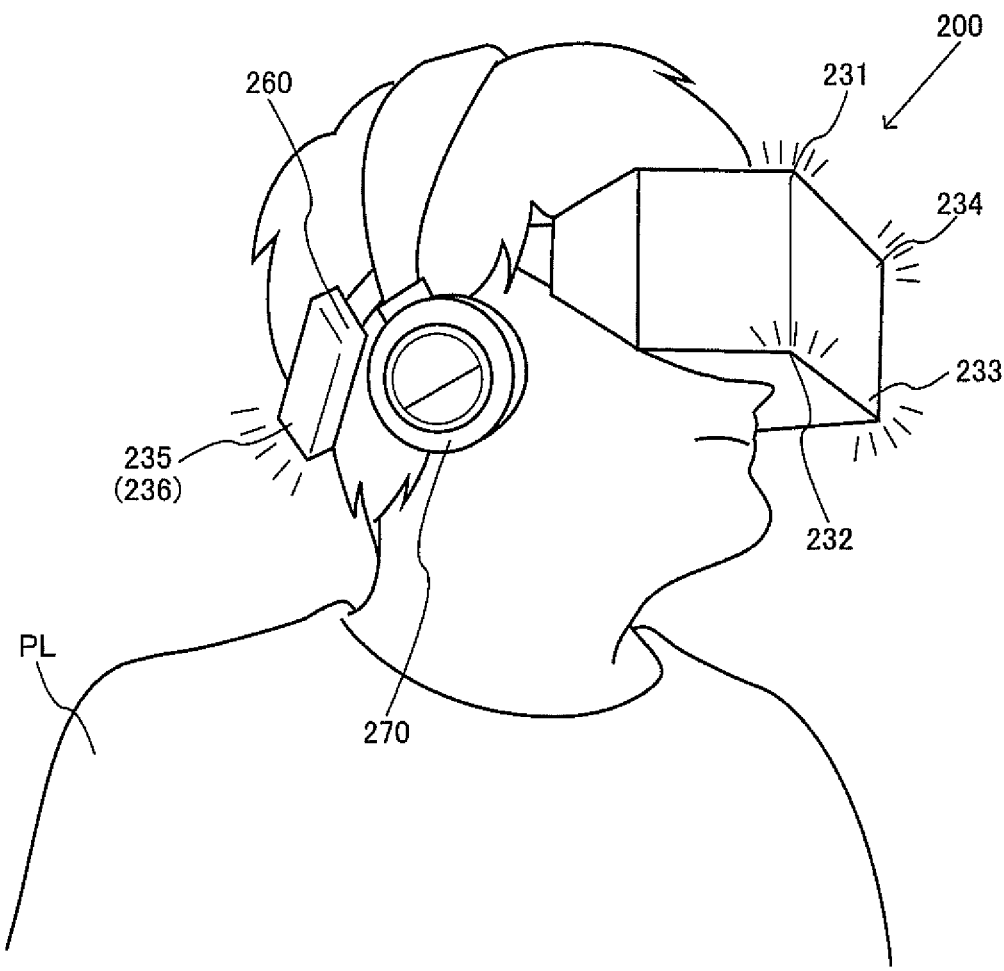
FIG. 3A and FIG. 3B illustrate another example of the HMD used in the present embodiment.
Figure 3B:
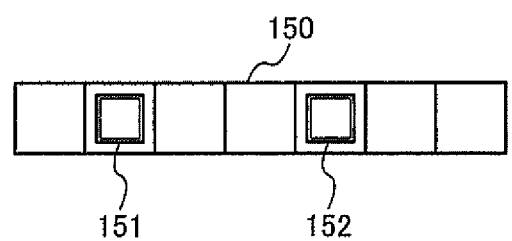

FIG. 3A illustrates another example of the HMD 200. The HMD 200 illustrated in FIG. 3A is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. An image capturing section 150 illustrated in FIG. 3B is provided on the forward side of the user PL, and captures an image of the light from the light emitting elements 231 to 236. Thus, the captured image obtained by the image capturing section 150 includes spots of the light from the light emitting elements 231 to 236. The head (HMD) of the user PL is tracked with image processing executed on the captured image. Thus, the three-dimensional position and the facing direction of the head of the user PL (the point-of-view position and the line-of-sight direction) are detected.

For example, as illustrated in FIG. 3B, the image capturing section 150 is provided with first and second cameras 151 and 152. The position of the head of the user PL in a depth direction and the like can be detected by using first and second captured images respectively captured by the first and the second cameras 151 and 152. Based on motion detection information obtained by the motion sensor provided to the HMD 200, the rotational angle (line-of-sight) of the head of the user PL can also be detected. Thus, with such an HMD 200, the display section 220 of the HMD 200 can display an image (an image as viewed from the virtual camera corresponding to the point-of-view of the user) of the virtual space (virtual three-dimensional space) corresponding to the direction in which the user PL is facing regardless of which of all 360 degrees directions he or she is facing. LEDs emitting infrared light, instead of the visible light, may be used as the light emitting elements 231 to 236. Furthermore, another method such as one using a depth camera or the like may be employed to detect the position and/or movement of the head of the user and the like.

The tracking process for detecting the point-of-view position and/or line-of-sight direction (the position and/or direction of the user) of the user is not limited to the method described with reference to FIG. 2A to FIG. 3B. For example, the tracking process may be implemented solely by the HMD 200 by using the motion sensor and the like provided to the HMD 200. Specifically, the tracking process is implemented without providing external devices such as the base stations 280 and 284 in FIG. 2B, the image capturing section 150 in FIG. 3B, and the like. Alternatively, various point-of-view tracking processes such as known eye tracking, face tracking, or head tracking can be employed to detect the point-of-view information such as the point-of-view position and the line-of-sight direction or the like of the user.

3. Specific Example of Simulation System

Figure 4:
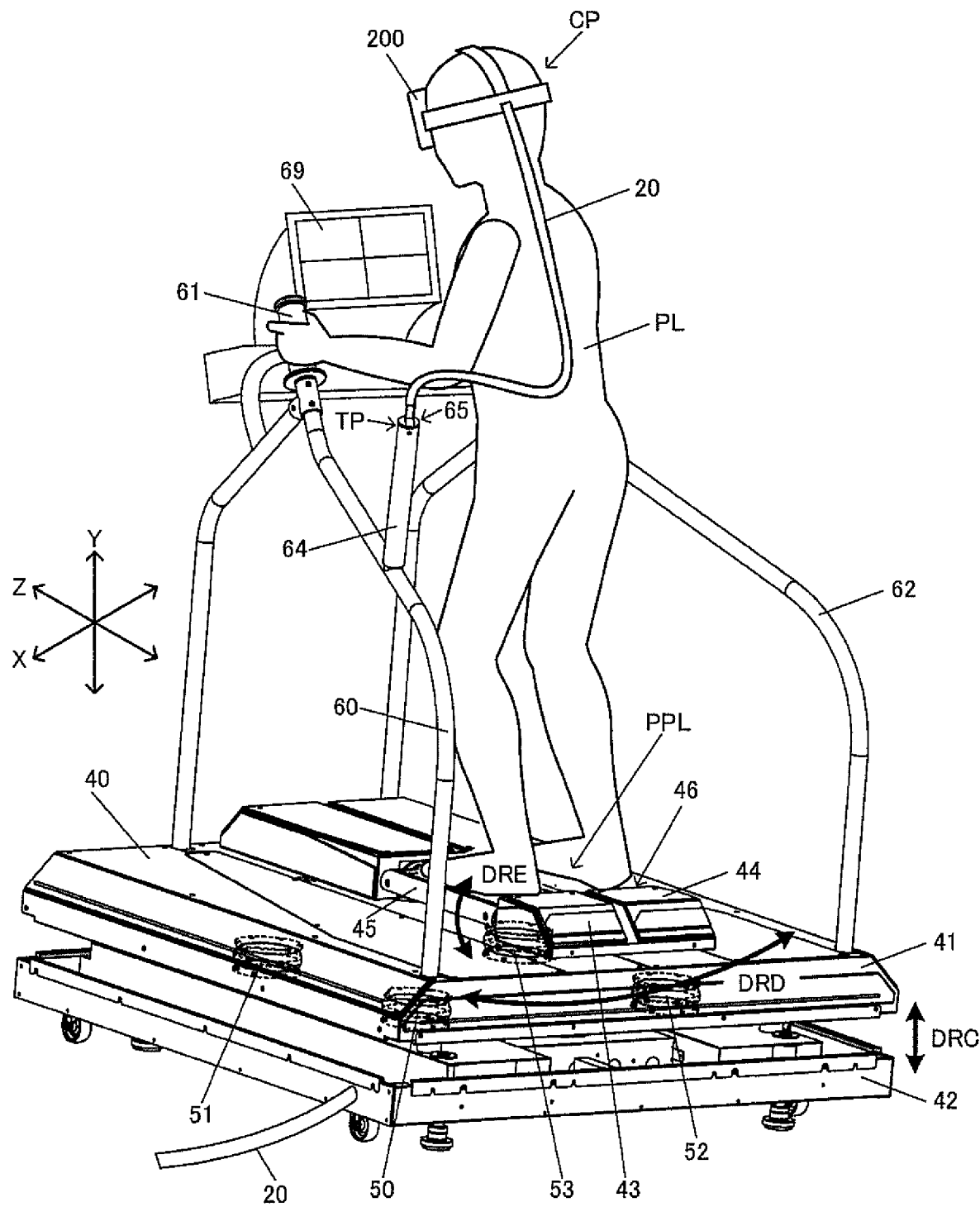
FIG. 4 illustrates a configuration example of a ski simulator that is an example of the simulation system.

Next, a specific example of the simulation system will be described. FIG. 4 is a perspective view illustrating a configuration example of a ski simulator that is an example of the simulation system.

The ski simulator illustrated in FIG. 4 includes the movable casing 40 that includes base sections 41 and 42 facing each other. The base sections 41 and 42 are provided to face each other in a DRC direction in FIG. 4. A space between the base sections 41 and 42 has the air spring sections 50, 51, 52, and 53 (extension/contraction sections in a broad sense) at its four corners. The air spring sections 50, 51, 52, and 53 extend/contract in the DRC direction with air supplied or discharged using an air compressor and valve.

For example, as illustrated in FIG. 4, the vertical direction corresponds to a Y axis direction, the facing direction of the user PL corresponds to a Z axis direction, and a direction orthogonal to the Y axis direction and the Z axis direction corresponds to an X axis direction. Under this condition, the base section 41 can be moved toward the upper side in the Y axis direction (upper side relative to the base section 42) with all of the air spring sections 50, 51, 52, and 53 extended. The base section 41 can be moved toward the downward side in the Y axis direction with all of the air spring sections 50, 51, 52, and 53 contracted. With these movements of the base section 41 in upward and downward direction, a condition of a snow surface on which the user skies and the like can be simulated. For example, bumps on the snow surface can be simulated with the base section 41 quickly moving upward and downward with small strokes.

Of the air spring sections 50, 51, 52, and 53 at the four corners, the left air spring sections 50 and 51 contract while the right air spring sections 52 and 53 extend, or the left air spring sections 50 and 51 may extend while the right air spring sections 52 and 53 contract so that rolling of the base section 41 about the Z axis can be implemented. The rear air spring sections 50 and 52 may contract while the front air spring sections 51 and 53 extend, or the rear air spring sections 50 and 52 may extend while the front air spring sections 51 and 53 contract so that pitching of the base section 41 about the X axis can be implemented. The status of a slope skied by the user can be expressed through such rolling and/or pitching.

The movable casing 40 includes the operation members 43 and 44. The operation members 43 and 44 are provided on the base section 41. The operation member 43 is provided with the rotatably mounted foot pedal 45 stepped on by the left foot of the user PL. The operation member 44 is provided with the rotatably mounted foot pedal 46 stepped on by the right foot of the user PL.

Specifically, the operation members 43 and 44 makes a swing movement (swinging) in a DRD direction in FIG. 4. This swing movement enables yawing about the Y axis. The foot pedals 45 and 46 pivot in a DRE direction. Thus, rotation about the Z axis can be implemented.

The user PL performs an operation using the operation members 43 and 44 and the foot pedals 45 and 46 with a skiing maneuver. For example, a ski operation simulating skiing in the real world is performed with a swing operation of causing the operation members 43 and 44 to make a swing movement in the DRD direction, and an edging operation of causing the foot pedals 45 and 46 to pivot in the DRE direction. As a result, the virtual user displayed on the HMD 200 performs a corresponding ski operation so that the user PL can experience virtual reality of skiing on a course in the virtual space.

The movable casing 40 is further provided with guide sections 60 and 62. The user PL plays a ski simulation game while standing on a play position PPL defined by the guide sections 60 and 62. The guide sections 60 and 62 are provided with holding sections 61 and 63 (the holding section 63 is not illustrated) held by the hands of the user PL. The holding sections 61 and 63 correspond to grips of skipoles in the real world. The user PL supports his or her body by gripping such holding sections 61 and 63 of the guide sections 60 and 62, representing the skipoles, with his or her hands. Then, the player enjoys the ski simulation game by making a skiing maneuver with the swing operation using the operation members 43 and 44, and an edging operation using the foot pedals 45 and 46, while holding the left and right holding sections 61 and 63 to support his or her body. Wind blows from a wind tunnel 69 provided in front of the user PL so that virtual reality providing a realistic feeling of the wind against his or her body while skiing can be implemented.

The guide section 60 also guides a cable 20, from a processing device (a device including the processing section 100 and the storage section 170 in FIG. 1. for example, a game device or a personal computer (PC)) for generating the display image on the HMD 200, from the lower side to the upper side along a predetermined route. For example, the guide section 60 is formed of a pipe with a hollow structure, and the cable 20 from the processing device passes through the pipe of the guide section 60 to be drawn out from a cable drawing port 65. Specifically, the guide section 60 includes a support guide 64 that has a rod shape and supports the cable 20 at the cable drawing port 65 as a via point TP, and the cable 20 is drawn out from the cable drawing port 65 as the via point TP to be connected to the HMD 200.

In FIG. 4, the air spring sections 50 to 53 extend and contract so that the movement of the base section 41 in the upward and downward directions as well as the rotational movement of the base section 41 including the rolling about the Z axis and the pitching about the X axis are implemented, and the play position PPL of the user PL changes accordingly. Specifically, the play position PPL that is a standing position of the user PL changes in accordance with the upward and downward movement and/or the rotational movement including rolling and pitching of the base section 41, on which the user PL stands. As described above, the movable casing 40 changes the play position PPL of the user PL in accordance with a change in the traveling direction of the moving body, such as a virtual user or a ridden moving body, in the virtual space or in accordance with the status of the course on which the moving body moves.

Figure 5:
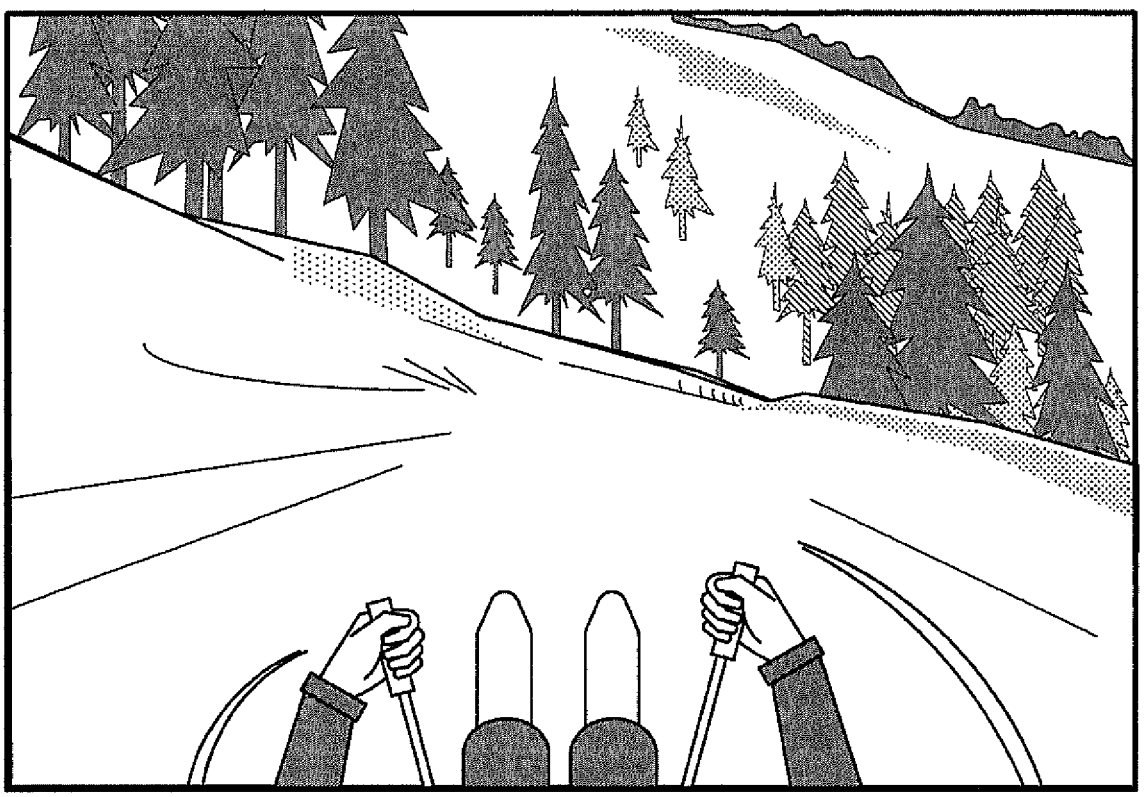
FIG. 5 illustrates an example of a game image for the ski simulator.

FIG. 5 illustrates an example of a game image (simulation image) displayed on the HMD 200 in the ski simulator in FIG. 4. This game image is what is known as a first person point-of-view image. The game image in FIG. 5 is displayed with realistic images of a ski course on which the virtual user (virtual skier), corresponding to the user, glides, and the scenery around the course. These images are displayed to the user as what is known as stereoscopic images through the HMD 200. In the game image, a body part of the virtual user, a ski board, and/or a skipole is displayed as appropriate. For example, in FIG. 4, when the user directs his or her line-of-sight downward, the change in the line-of-sight direction is detected through the process described with reference to FIG. 2A to FIG. 3B, and a body part (such as a hand or a foot) of the virtual user, a ski board, and/or a skipole is displayed on the game image as in FIG. 5. Thus, the user can feel the virtual reality as if he or she is skiing as an actual skier, in the virtual space.

FIG. 6 is a perspective view illustrating a configuration example of a robot simulator (robot game device) as an example of the simulation system. The movable casing 40 illustrated in FIG. 6 has a cover section 451 and a base section 452 (base) provided over a bottom section 450 (base section) in this order. The base section 452 is provided with a seat support section 464. A ride section 460 is formed with a seat 462 attached on the seat support section 464.

The base section 452 is provided with a movement section 470. Specifically, the base section 452 is provided with rail sections 454 and 455, and the movement section 470 is provided to be movable in a direction along the rail sections 454 and 455.

The movement section 470 has a support section 472 with an upper end provided with an upper surface section 473 (operation board). The upper surface section 473 is provided with the operation levers 161 and 162 and a game controller 165 having a sensor section. The sensor section of the game controller 165 detects at least one of the position and the direction. The operation levers 161 and 162 are part of the operation section 160 in FIG. 1. When the user manually operates the operation levers 161 and 162, the virtual user in a cockpit of the robot in the virtual space is displayed to operate the operation levers in the cockpit accordingly.

When the user pushes down the operation levers 161 and 162 forward, the robot in the virtual space moves forward. When the user pulls down the operation levers 161 and 162 rearward, the robot in the virtual space moves rearward. When the user pushes down the operation levers 161 and 162 rightward or leftward, the robot moves rightward or leftward. By pushing down one of the operation levers 161 and 162 forward, and pulling down the other one rearward, the orientation of the robot can be changed.

The game controller 165 is provided with at least one light receiving element used as a sensor section. A detection function (a function of detecting at least one of the position and the direction) of the sensor section of the game controller 165 is implemented with a process similar to the tracking process illustrated in FIGS. 2A and 2B. With this detection function, a change in the play position (the ride position and the seated position of the ride section 460) due to the movement of the movable casing 40 can be detected for example.

The support section 472 of the movement section 470 has a lower end provided with a lower surface section 474 provided with the accelerator pedal 163 and the brake pedal 164. When the user depresses the accelerator pedal 163, the robot makes a dash movement that is an accelerated movement in the virtual space. When the user depresses the brake pedal 164, the movement of the robot stops.

The base section 452 of the movable casing 40 is provided with a frame section 430. The frame section 430 has a guide section 423 that guides the cable 20 from the process device. For example, the cable 20 is guided through a predetermined route from the lower side to the upper side for example. The guided cable 20 is connected to the HMD 200 via the via point TP. Specifically, the cable 20 is fixed by a fixing jig 433 at the via point TP to be connected to the HMD 200.

The seat 462 of the ride section 460 has a rear surface side provided with two unillustrated electric cylinders. With extension and contraction of rod sections of these electric cylinders, the orientation of the base section 452 changes. For example, the orientation change such as pitching and/or rolling of the base section 452 is implemented. For example, when the rod sections of the two electric cylinders simultaneously extend, the orientation change corresponding to the pitching of the base section 452 toward the forward side is implemented. When the rod sections of the two electric cylinders simultaneously contract, the orientation change corresponding to the pitching of the base section 452 toward the rearward side is implemented. When one of the rod sections of the two electric cylinders extends and the other one contracts, orientation change corresponding to rightward or leftward rolling of the base section 452 is implemented. Through the orientation change corresponding to the pitching and/or rolling of the base section 452, pitching and/or rolling can be implemented for the orientation of the user's body.

Figure 7:
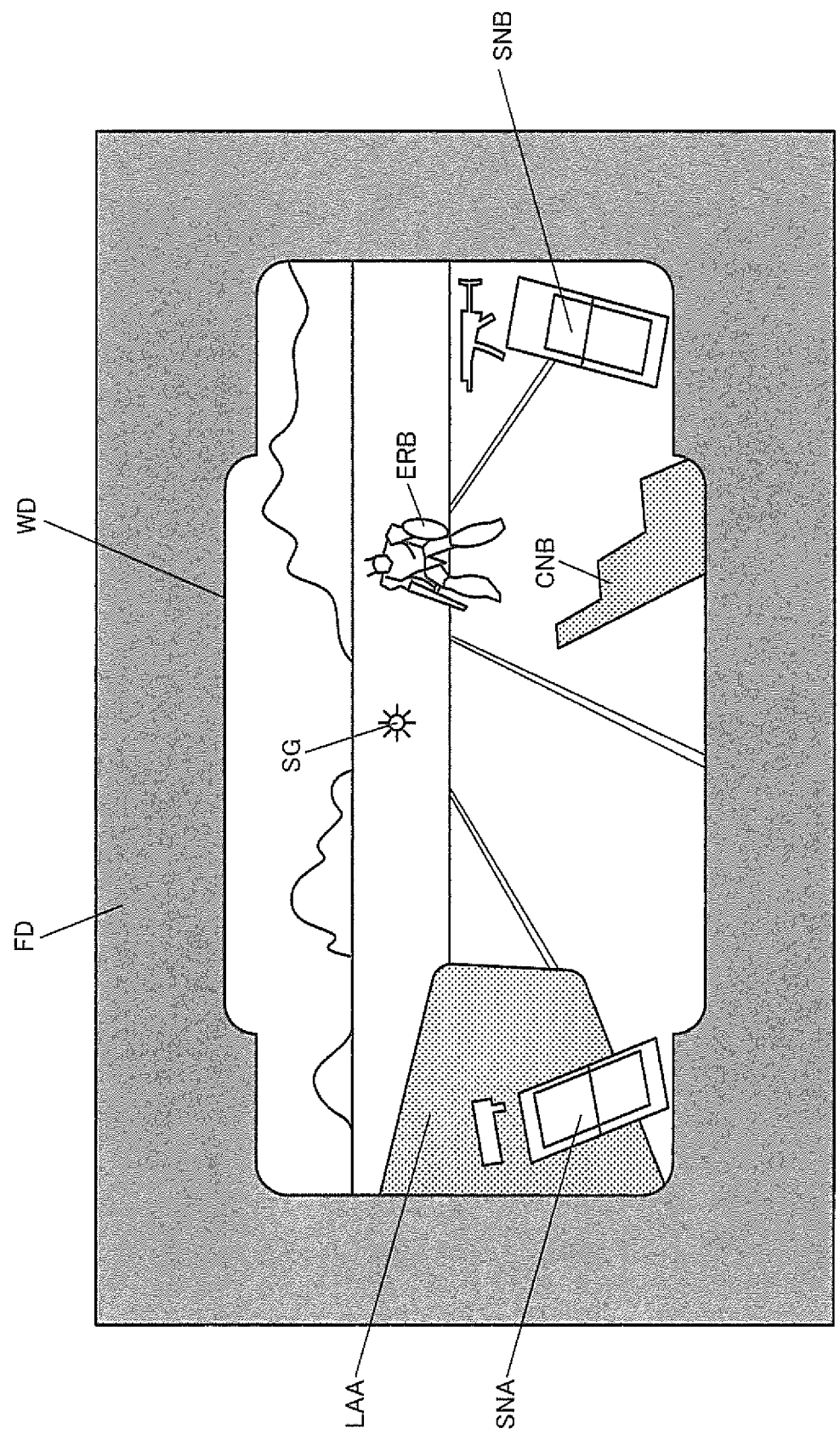
FIG. 7 illustrates an example of a game image for the robot simulator.

FIG. 7 illustrates an example of the game image displayed on the HMD 200 in the robot simulator in FIG. 6. In the present embodiment, a game image is generated for a robot game in which the virtual user corresponds to the user in the cockpit of the robot in the virtual space to fight an enemy robot etc. When the robot makes a sortie, a hood of the cockpit is closed in the virtual world. Then, the user (virtual user) operates the robot in the cockpit with a limited space to enjoy the game of fighting with an enemy robot etc.

As illustrated in the game image in FIG. 7, a hood FD of a Visual Flight Rules cockpit of the robot in the virtual world is provided with a window WD, through which the user can see the outside. On the window WD in FIG. 7, an enemy robot ERB, cross hairs SG, and a map of the battle field are displayed. Furthermore, missile launcher LAA and cannon CNB as weapons of the robot operated by the user, and ammunition counter icons SNA and SNB indicating the remaining ammunitions of these weapons are displayed.

The cross hairs SG move to follow the movement of the line-of-sight (head, HMD) of the user wearing the HMD 200. For example, the cross hairs SG on the game image moves rightward when the user turns his or her head rightward, and moves leftward when the user turns his or her head leftward. The user enjoys the battle game by moving the position of the cross hairs SG to the position of the enemy robot ERB, and attacking the enemy robot by firing the launcher LAA and/or the cannon CNB.

The apparatus implementing the simulation system according to the present embodiment is not limited those illustrated in FIG. 4 and FIG. 6. For example, the simulation system according to the present embodiment can be applied to various apparatuses using an HMD as a display section including a consumer game apparatus, an arcade game apparatus, a PC, a portable information terminal, and a large attraction system where a large number of users play the game. The simulation system according to the present embodiment can be implemented with a server system to which a plurality of terminal devices (such as a game device, a PC, and a portable information terminal) communicably connected through a network. In such a case, the processes according to the present embodiment may be implemented as a process performed by the simulation system and the terminal device in cooperation.

4. Method According to the Present Embodiment

Next, a method according to the present embodiment will be described in detail. The following description is given mainly based on an example where the method according to the present embodiment is applied to the ski game using the ski simulator in FIG. 4. The present embodiment is not limited to this and can be applied to various games (a roll playing game (RPG), a robot battle game, an action game, a battle game, a racing game, a sport game, a thriller experience game, a simulation game for rides such as trains and aircrafts, a puzzle game, a communication game, or a music game) and to something other than games. The following description is given based on an example where the moving body is a character serving as a virtual user. Alternatively, the moving body may be a ridden moving body such as a robot, a car, an aircraft, or a train ridden by the virtual user.

4.1 Process of Disabling Orientation Change of Virtual Camera

Figure 8:
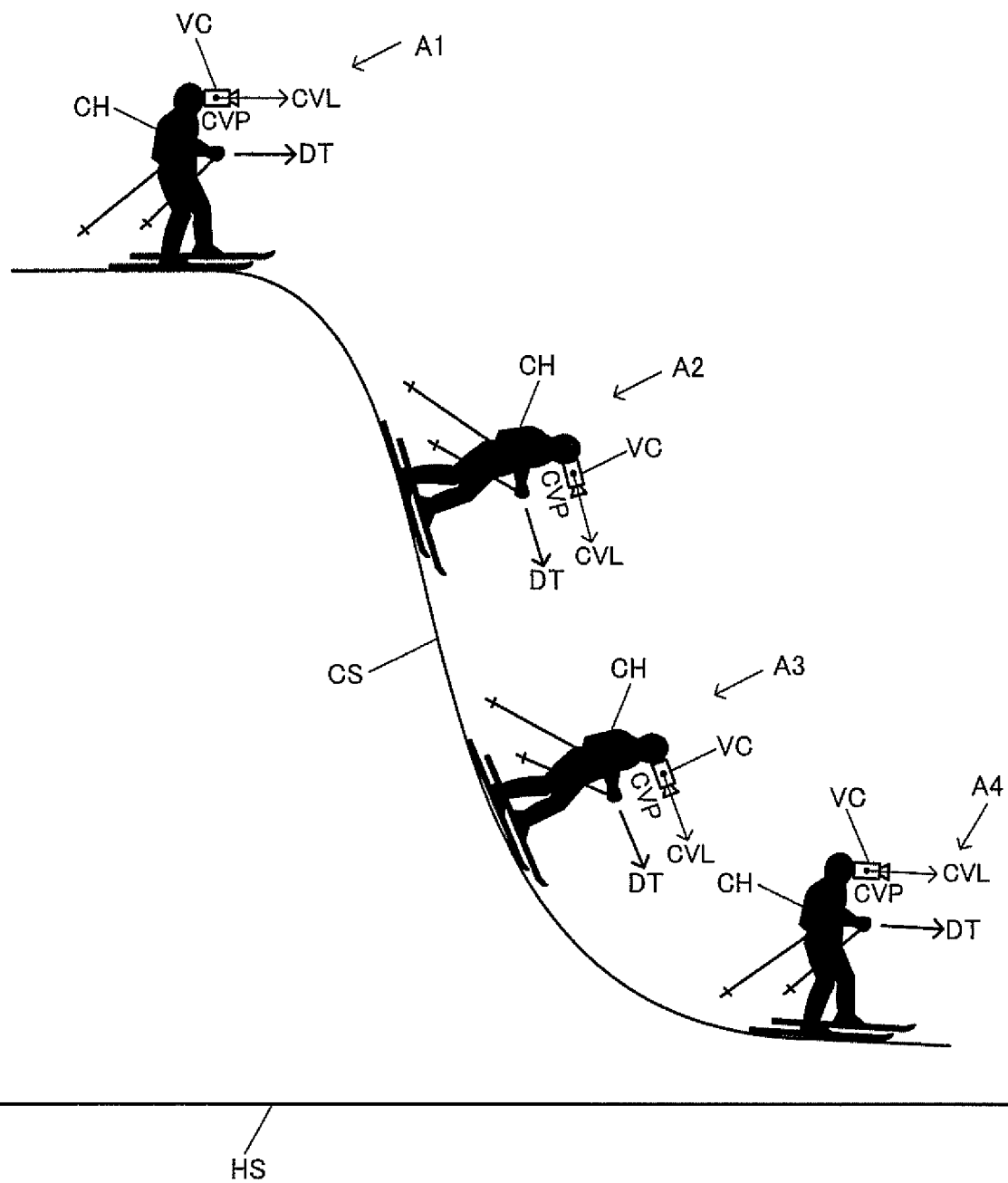
FIG. 8 is a diagram illustrating a problem caused by orientation change of a virtual camera in response to a change in a traveling direction of a moving body.

FIG. 8 is a diagram illustrating a character CH (moving body in a broad sense) as a skier gliding to travel on a course CS in a virtual space. A virtual camera VC is set to be at the position of the point-of-view of the character CH corresponding to the virtual user in the virtual space, and an image as viewed from the virtual camera VC is (stereoscopically) displayed on the HMD 200 as illustrated in FIG. 5. Thus, the image in the first person point-of-view can be displayed on the HMD 200, and thus the user can feel virtual reality as if he or she is actually the skier traveling on the course CS in the virtual space.

In FIG. 8, a horizontal plane HS is a horizontal plane (XZ plane) in the world coordinate system in the virtual space. In a flat course CS as illustrated in A1 in FIG. 8, a traveling direction DT of the character CH is in parallel (substantially parallel, the same applies to the following description) to the horizontal plane HS. A line-of-sight direction CVL of the virtual camera VC is also in parallel (substantially parallel) to the horizontal plane HS. A point-of-view position CVP of the virtual camera VC is set to be at the point-of-view position (the position of the eyes for example) of the character CH for example, whereby the first person point-of-view is implemented.

In A2 and A3 in FIG. 8, the character CH travels on the downhill course CS so that the traveling direction DT of the character CH has a depression angle relative to the horizontal plane HS. The character CH is taking a vertically (substantially vertical, the same applies to the following description) standing posture relative to the surface of the downhill course CS. Thus, the line-of-sight direction CVL of the virtual camera VC has a depression angle relative to the horizontal plane HS. Then, in A4, the character CH travels on the flat course CS, and thus the traveling direction DT and the line-of-sight direction CVL of the virtual camera VC return to be in parallel to the horizontal plane HS.

As described above, in FIG. 8, when the traveling direction DT changes as illustrated in A1 to A4 along with the traveling of the character CH on the course CS, the line-of-sight direction CVL of the virtual camera VC changes accordingly. When the first person point-of-view image is displayed on the HMD, generally, the line-of-sight direction CVL of the virtual camera VC changes in accordance with the change in the traveling direction DT as illustrated in FIG. 8. When the line-of-sight direction CVL of the virtual camera VC thus changes, the display image on the HMD in FIG. 5 largely changes in accordance with the change in the line-of-sight direction CVL. For example, in A1, A2, and A3 in FIG. 8, the display image changes from that as viewed in the line-of-sight direction CVL in parallel with the horizontal plane HS, to that as viewed in the line-of-sight direction CVL having a depression angle relative to the horizontal plane HS, and then in A4, the display image returns to that as viewed in the line-of-sight direction CVL in parallel with the horizontal plane HS. Thus, the display image on the HMD is largely shaken due to a large change in the line-of-sight direction CVL of the virtual camera VC as a result of the change in the traveling direction DT of the character CH. For example, when the course CS has small bumps, the display image is massively shaken in accordance with the bumps.

Such a shaken display image makes the user feel what is known as 3D sickness. For example, the 3D sickness is sort of motion sickness, such as dizziness, experienced by a person continuously watching stereoscopic video involving a large amount of movement.

For example, a skier in the real world gliding on a course with undulation as illustrated in FIG. 8 detects a change in the traveling direction (change in the acceleration, a change in gravitational direction, and a change in centrifugal force) with his or her semicircular canal, and directs his or her line-of-sight direction to look toward the far side. Thus, no change in a viewed image occurs so as not to feel the sickness.

However, in a VR system in which the world of the virtual space is seen through the HMD, the change in the line-of-sight direction CVL of the virtual camera VC due to the change in the traveling direction DT as illustrated in FIG. 8 results in the display image on the HMD being shaken regardless of the intention and/or the feeling of the user. For example, despite the fact that the user in the real world is not actually traveling the downward or upward course, only the display image on the HMD changes in accordance with downward and upward inclination of the course in the virtual space, leading to deviation from the intention and feeling of the user, resulting in the 3D sickness.

In this context, the movable casing 40 in FIG. 4 has the base section 41 pitching about the X axis in accordance with the downward and upward inclination of the course in the virtual space, so that the user can somewhat feel the downward and upward inclination of the course in the virtual space. However, when the inclination of the course in the virtual space is about 20° to 40°, the inclination by the pitching of the base section 41 in FIG. 4 can be no larger than approximately 10° for example. Thus, due to such a large difference from the inclination of the course in the virtual world, the pitching of the base section 41 in FIG. 4 cannot sufficiently prevent the 3D sickness due to the display image being shaken.

In view of this, with the control method for the virtual camera VC in FIG. 8, the HMD displays an image as if the user's head is forcibly moved downward and upward in accordance with the shape of the course in the virtual space regardless of the intention and the feeling of the user, resulting in the 3D sickness.

In view of this, the present embodiment maintains the line-of-sight direction CVL of the virtual camera VC corresponding to the line-of-sight direction of the user to be constantly in parallel (substantially in parallel) with the horizontal plane HS, as long as the user does not move his or her head. Thus, when the course CS in the virtual space has an inclination (undulation), the line-of-sight direction CVL of the virtual camera VC does not change in accordance with the inclination of the course CS as in FIG. 8. Instead, the virtual camera VC is controlled so that the line-of-sight direction CVL is in parallel with the horizontal plane HS. This does not mean that the line-of-sight direction CVL of the virtual camera VC is constantly fixed to be in parallel with the horizontal plane HS. When the user moves the line-of-sight direction in a downward or an upward direction with his or her intention or based on his or her feeling, the line-of-sight direction CVL of the virtual camera VC is directed downward or upward accordingly. Thus, the line-of-sight direction can be prevented from changing against the user's intention and/or feeling, while being able to be changed based on the user's intention and/or response. All things considered, improvement of the virtual reality felt by the user and prevention of the 3D sickness due to the display image on the HMD being shaken can both be achieved.

More specifically, in the present embodiment, the tracking information for the point-of-view information about the user is acquired, and the position and/or the orientation of the virtual camera VC is changed based on the tracking information acquired. Here, the position and the orientation of the virtual camera VC respectively correspond to the point-of-view position CVP and the line-of-sight direction CVL.

Figure 9A:
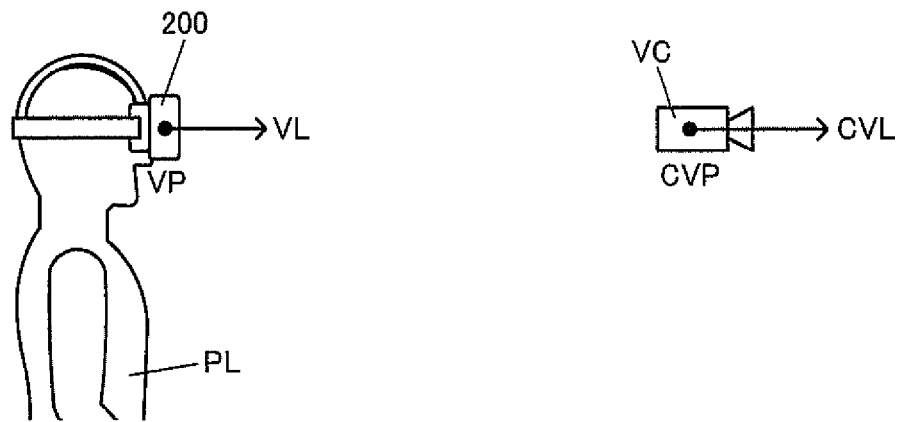
FIG. 9A to FIG. 9C are diagram illustrating a method of changing a position and/or orientation of the virtual camera based on tracking information.
Figure 9B:
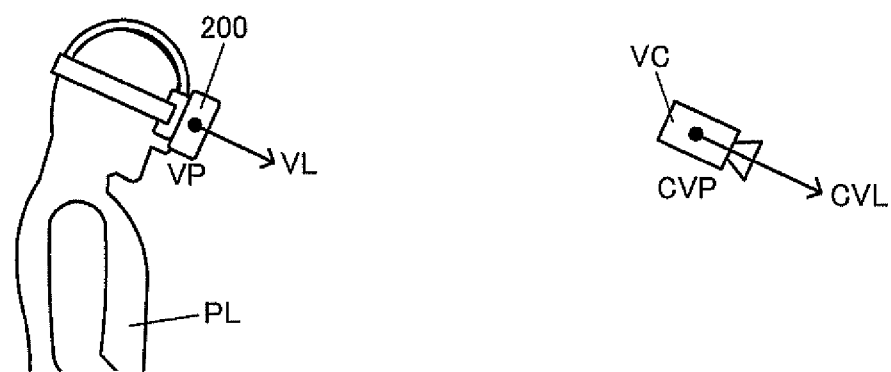
Figure 9C:
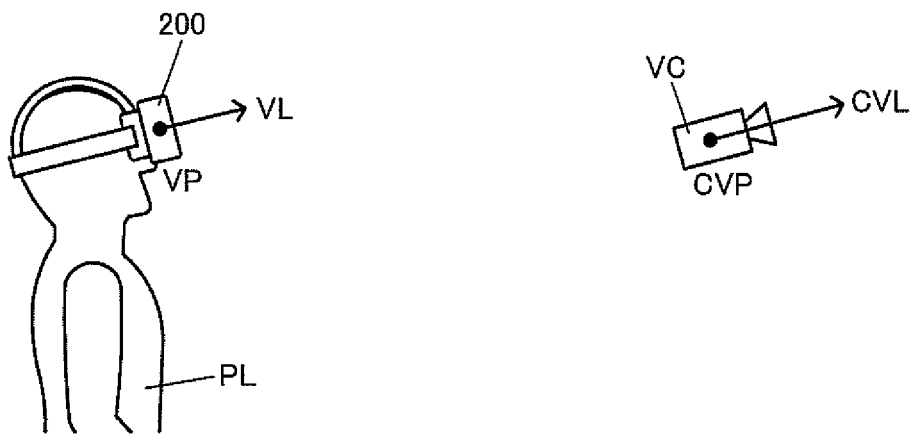

For example, as illustrated in FIG. 9A to FIG. 9C, when the user PL in the real world moves a line-of-sight direction VL (head) downward or upward, the tracking information (point-of-view tracking information) for the point-of-view information about the user PL is acquired through the tracking process for the HMD 200 for example. Then, the point-of-view position CVP and/or the line-of-sight direction CVL of the virtual camera VC is set based on the tracking information (information identifying the point-of-view position and/or the line-of-sight direction of the user) to change the position and/or the orientation of the virtual camera VC as illustrated in FIG. 9A to FIG. 9C. For example, as illustrated in FIG. 9B, the line-of-sight direction CVL of the virtual camera VC is directed downward when the line-of-sight direction VL of the user PL is directed downward. For example, as illustrated in FIG. 9C, the line-of-sight direction CVL of the virtual camera VC is directed upward when the line-of-sight direction VL of the user PL is directed upward. With this configuration, when the user PL in the real world changes the point-of-view position VP and/or the line-of-sight direction VL, the point-of-view position CVP and/or the line-of-sight direction CVL of the virtual camera VC changes accordingly. Thus, the virtual camera VC behaves like the actual first person point-of-view of the user PL, whereby improved virtual reality can be provided.

Figure 10:
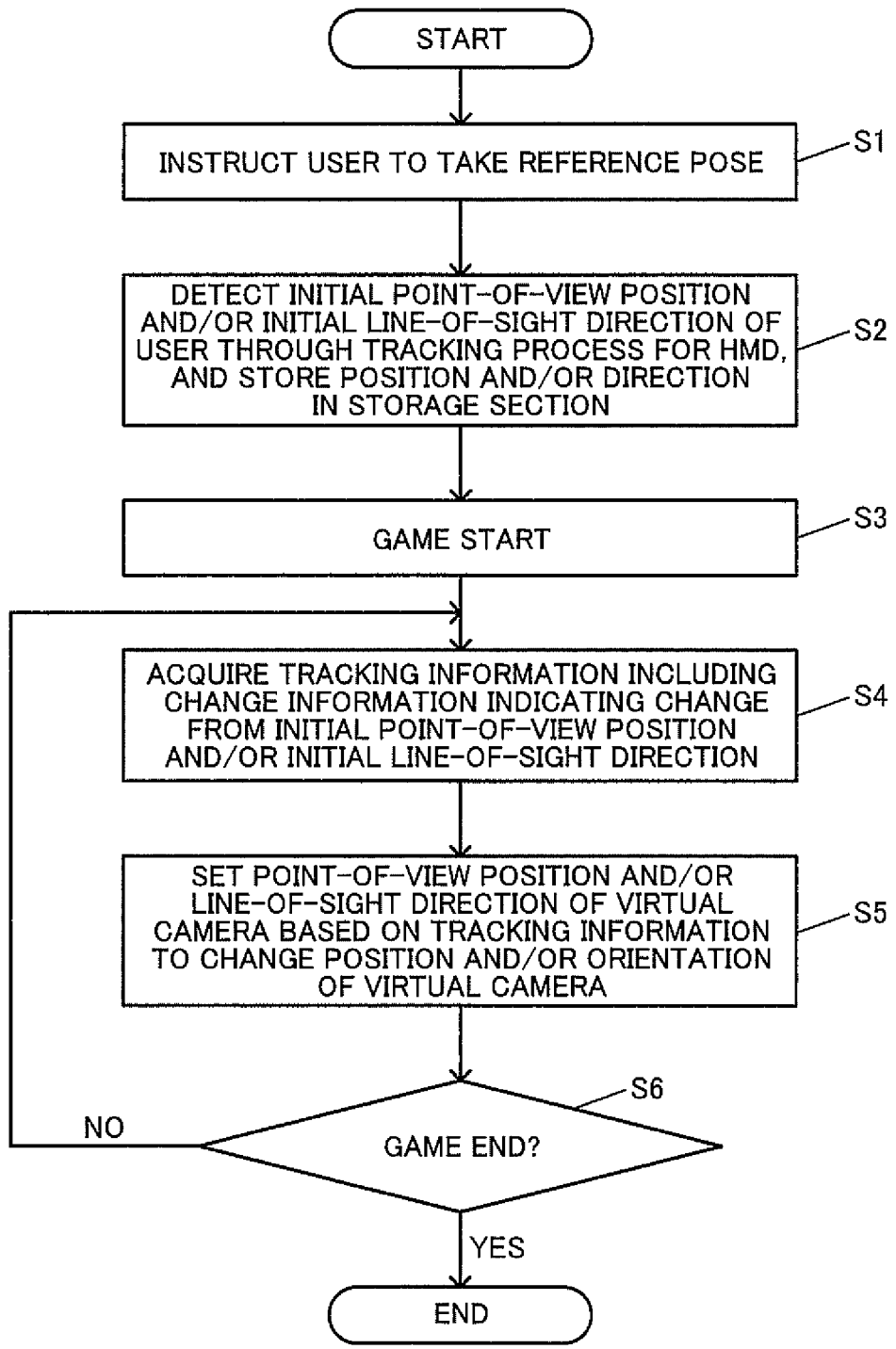
FIG. 10 is a flowchart illustrating a specific example of a process of changing a position and/or orientation of the virtual camera based on the tracking information.

FIG. 10 is a flowchart illustrating a specific example of a process of changing the position and/or the orientation of the virtual camera based on the tracking information. In FIG. 3, the change information indicating a change of the point-of-view information from the initial point-of-view information of the user is acquired as the tracking information through the tracking process for the HMD 200.

First of all, the user is instructed to take a reference pose (step S1). For example, the user riding the movable casing 40 in FIG. 4 is instructed to take the reference pose (standing posture that serves as the reference), with a display image on the HMD 200. Then, the initial point-of-view position and/or the initial line-of-sight direction of the user is detected through the tracking process for the HMD 200 and is stored in a storage section (a storage section of the HMD and/or the simulation system) (step S2). For example, the point-of-view position and/or the line-of-sight direction of the user taking the reference pose in step S1 is detected and stored as an initial point-of-view position and/or an initial line-of-sight direction. Then, based on the initial point-of-view position and/or the initial line-of-sight direction, an initial point-of-view position and/or an initial line-of-sight direction of the virtual camera is set.

Then, when the game starts (step S3), the change information indicating a change from the initial point-of-view position and/or the initial line-of-sight direction stored in step S2 is acquired as the tracking information. Thus, the change information about the point-of-view position and/or the line-of-sight direction of the user is acquired as the tracking information. For example, the change information about the point-of-view position is a change value of coordinates of the point-of-view position, and the change information about the line-of-sight direction is a change value of the rotational angle (a rotational angle about the rotation axis) representing the line-of-sight direction. For example, it is assumed that the coordinates of the initial point-of-view position is (x0,y0,z0), and that the change value of the coordinates of the point-of-view position is ($\Delta$x,$\Delta$y,$\Delta$z). Furthermore, it is assumed that the rotational angle representing the initial line-of-sight direction is ($\theta$x0,$\theta$y0,$\theta$z0), and that the change value of the rotational angle representing the line-of-sight direction is ($\Delta\theta$x,$\Delta\theta$y,$\Delta\theta$z). Under these conditions, the current point-of-view position can be represented by (x,y,z)=(x0+$\Delta$x,y0+$\Delta$y,z0+$\Delta$z), and the current rotational angle of the line-of-sight direction can be represented by ($\theta$x,$\theta$y,$\theta$z)=($\theta$x0+$\Delta\theta$x,$\theta$y0+$\Delta\theta$y,$\theta$z0+$\Delta\theta$z).

Next, the point-of-view position and/or the line-of-sight direction of the virtual camera is set based on the tracking information to change the position and/or the orientation of the virtual camera (step S5). These processes are performed until the game ends (step S6). The point-of-view position and/or the line-of-sight direction of the virtual camera can be set by a process of adding ($\Delta$x,$\Delta$y,$\Delta$z), ($\Delta\theta$x,$\Delta\theta$y,$\Delta\theta$z) described above to the coordinates of the initial point-of-view position and the rotational angle representing the initial line-of-sight direction of the virtual camera.

With the method described with reference to FIG. 10, the virtual camera is set to be at the point-of-view position of the character, regardless of the height (body size) of the user riding the movable casing 40 in FIG. 4. Thus, characters of different models need not to be prepared in accordance with the height of the user for example, whereby reduction of a data amount and the like can be achieved. For example, the visual user can be implemented for both tall and short users, with a character of the same shaped model. Note that a method of preparing characters of different models in accordance with the height (body size) of the user can be employed.

As described above, in the present embodiment, the position and/or the orientation of the virtual camera VC is changed based on the tracking information acquired through the tracking process, as illustrated in FIG. 9A to FIG. 10. Thus, when the user in the real world changes the point-of-view position and/or the line-of-sight direction, the point-of-view position and/or the line-of-sight direction of the virtual camera VC in the virtual space changes accordingly, whereby the user can experience improved virtual reality.

On the other hand, in the present embodiment, the virtual camera VC is also set to disable (or limit) the orientation change corresponding to at least one of the pitching and rolling of the virtual camera VC in response to the change in the traveling direction DT of the character CH (moving body) as in FIG. 8.

Figure 11:
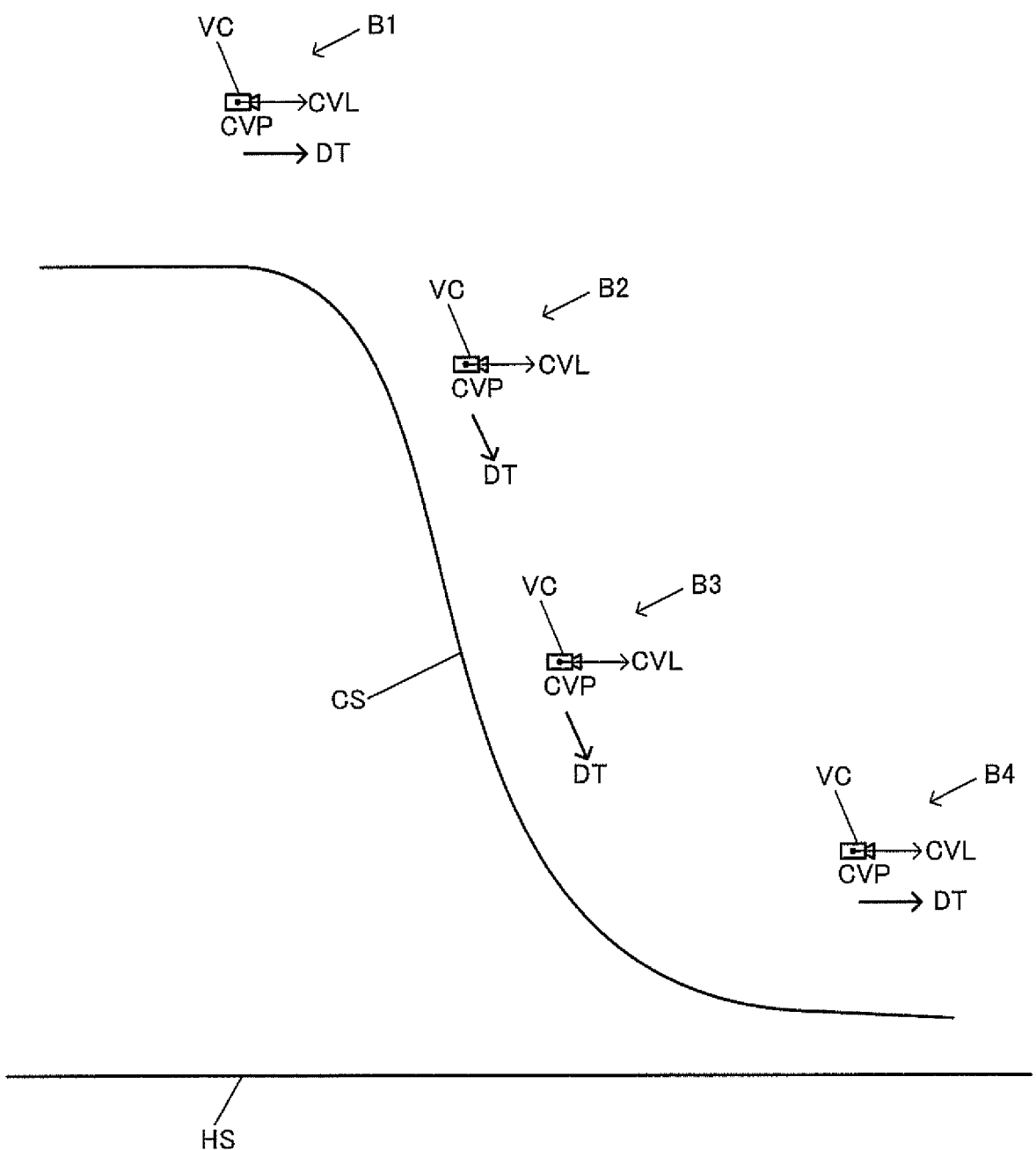
FIG. 11 is a diagram illustrating a method according to the present embodiment of disabling the orientation change of the virtual camera.

For example, in FIG. 11, the traveling direction DT of the character CH changes as illustrated in B1, B2, B3, and B4 as the character CH travels on the downhill course CS. Also in such a case in FIG. 11, the orientation change corresponding to the pitching of the virtual camera VC (rotational motion about the rotation axis corresponding to pitching) is not performed, and the line-of-sight direction CVL of the virtual camera VC is maintained to be in parallel with the horizontal plane HS for example. Specifically, in FIG. 8, the line-of-sight direction CVL of the virtual camera VC is changed in accordance with the status (such as inclination, undulation, or shape) of the course CS, and the orientation change corresponding to the pitching of the virtual camera VC is performed. On the other hand, in FIG. 11, the line-of-sight direction CVL of the virtual camera VC does not depend on the status of the course CS, and the orientation change corresponding to the pitching of the virtual camera VC is not performed. Still, the line-of-sight direction CVL of the virtual camera VC in FIG. 11 is not constantly fixed to be in parallel with the horizontal plane HS, and changes when the user directs the line-of-sight direction upward or downward as described with reference to FIG. 9A to FIG. 10.

Figure 12:
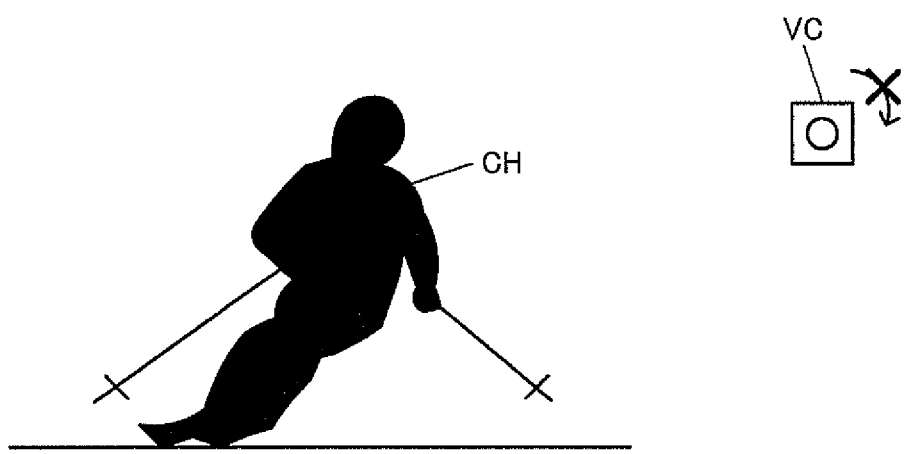
FIG. 12 is a diagram illustrating a method according to the present embodiment of disabling the orientation change of the virtual camera.

In the present embodiment, the orientation change corresponding to the rolling of the virtual camera VC is not performed as illustrated in FIG. 12, even when a situation where the rolling may be performed occurs in accordance with the change in the traveling direction of the character CH for turning right or left. Specifically, the virtual camera VC is set so as not to rotate about the rotation axis for the rolling. With this configuration, in the display image on the HMD in FIG. 5, no change in the horizontal direction occurs unless the user turns his or her head left or right, whereby the 3D sickness can be suppressed.

Note that orientation change corresponding to the yawing of the virtual camera VC is performed for example, when a change in the traveling direction of the character CH for turning right or left occurs. For example, the orientation change corresponding to yawing is performed so that when the character CH turns right, the line-of-sight direction CVL of the virtual camera VC is directed rightward, and when the character CH turns left, the line-of-sight direction CVL of the virtual camera VC is directed leftward. With this configuration, the user can see an image that is supposed to be shown in the traveling direction of the character CH as the virtual user through the virtual camera VC, whereby an appropriate image can be displayed as a display image on the HMD in FIG. 5.

For example, an axis along a long axis (optical axis) of the virtual camera VC is defined as a ZV axis, axis orthogonal to the ZV axis and in parallel with the vertical direction of the world coordinate system is defined as a YV axis, and an axis orthogonal to the ZV axis and the YV axis is defined as an XV axis. In such a case, for example, the pitching of the virtual camera VC is a rotational motion about the XV axis. For example, the rolling of the virtual camera VC is a rotational motion about the ZV axis. For example, the yawing is a rotational motion about the YV axis. The virtual camera VC is set so that in FIG. 11, the pitching of the virtual camera VC, which is the rotational motion about the XV axis, is not performed and in FIG. 12, the rolling of the virtual camera VC, which is the rotational motion about the ZV axis, is not performed. However, the yawing of the virtual camera VC, which is the rotational motion about the YV axis, is allowed.

With reference to FIG. 11 and FIG. 12, the cases where the orientation change of the virtual camera VC corresponding to the pitching and rolling is disabled are described in a case where the traveling direction changes. Note that the virtual camera VC may be controlled to limit (suppress) the orientation change. For example, $\alpha$ is assumed to represent a change in a pitch angle of the virtual camera VC in a case where the line-of-sight direction CVL of the virtual camera VC is changed to be in parallel with the traveling direction DT of the character CH as illustrated in FIG. 8. Under such a condition, in FIG. 11, a change in the pitch angle of the virtual camera VC is $\Delta\theta p=0$, and the orientation change corresponding to the pitching of the virtual camera VC may be limited so that $\Delta\theta p$ can be sufficiently reduced to be $\Delta\theta p<\alpha$. In the rolling for the cornering in FIG. 12, $\beta$ is assumed to represent a change in a rolling angle that is an angle of a body axis (an axis along a longitudinal direction, vertical axis) of the character CH relative to the axis in the vertical direction. Under such a condition, in FIG. 12, a change in the roll angle of the virtual camera VC is $\Delta\theta r=0$, and the orientation change corresponding to the rolling of the virtual camera VC can be limited so that $\Delta\theta r$ is sufficiently reduced to be $\Delta\theta<\beta$.

As described above, with the present embodiment, even in a situation where the pitching and/or the rolling may occur due to a change in the traveling direction DT of the character CH (moving body), the pitch angle and the roll angle of the virtual camera VC remains unchanged (or a change in the pitch angle and/or the roll angle is limited). Thus, the display image on the HMD can be prevented from being largely or massively shaken, whereby 3D sickness can be prevented. In such a case, when the user changes the point-of-view position VP and/or the line-of-sight direction VL by moving his or her head or making the other like action, the orientation of the virtual camera VC changes accordingly as illustrated in FIG. 9A to FIG. 9C. Thus, the user can feel virtual reality as if he or she is an actual skier gliding down the course. Thus, the present embodiment can provide a simulation system that can achieve both prevention of problem such as 3D sickness and improvement of virtual reality.

For example, in a method according to Comparative Example of the present embodiment, the line-of-sight direction of the virtual camera may be set to be constantly in parallel with the horizontal plane. This method according to Comparative Example is suitable for a system for generating a pseudo three-dimensional image as viewed from a normal third person point-of-view. However, this method according to Comparative Example makes the line-of-sight direction of the virtual camera constantly fixed to be in parallel with the horizontal direction regardless of the intention and/or reaction of the user, and thus is unsuitable for systems using the HMD.

On the other hand, with the method according to the present embodiment, when the point-of-view position and/or the line-of-sight direction of the user in the real world changes due to a movement of his or her head as the user's intentional or unintentional reaction, the point-of-view position and/or the line-of-sight direction of the virtual camera in the virtual world changes accordingly (FIG. 9A to FIG. 9C). Thus, a change in the point-of-view of the virtual camera reflecting a change in the point-of-view based on the intention and response of the user can be implemented, so that virtual camera control optimum for the system using HMDs can be implemented, whereby the improvement of the virtual reality experienced by the user and the like can be achieved. In the present embodiment, while such a change in the point-of-view based on an intention and reaction of the user is reflected, the influence of a change in the traveling direction of the moving body is not reflected on the orientation change corresponding to the pitching and/or the rolling of the virtual camera. Thus, a simulation system that can improve the virtual reality while preventing the 3D sickness and the like can be provided.

4.2 Specific Example

Various methods may be contemplated as a method of implementing the process of disabling (limiting) the orientation change of the virtual camera corresponding to the pitching and/or rolling. For example, FIG. 13 is a diagram illustrating a first implementation method.

Figure 13:
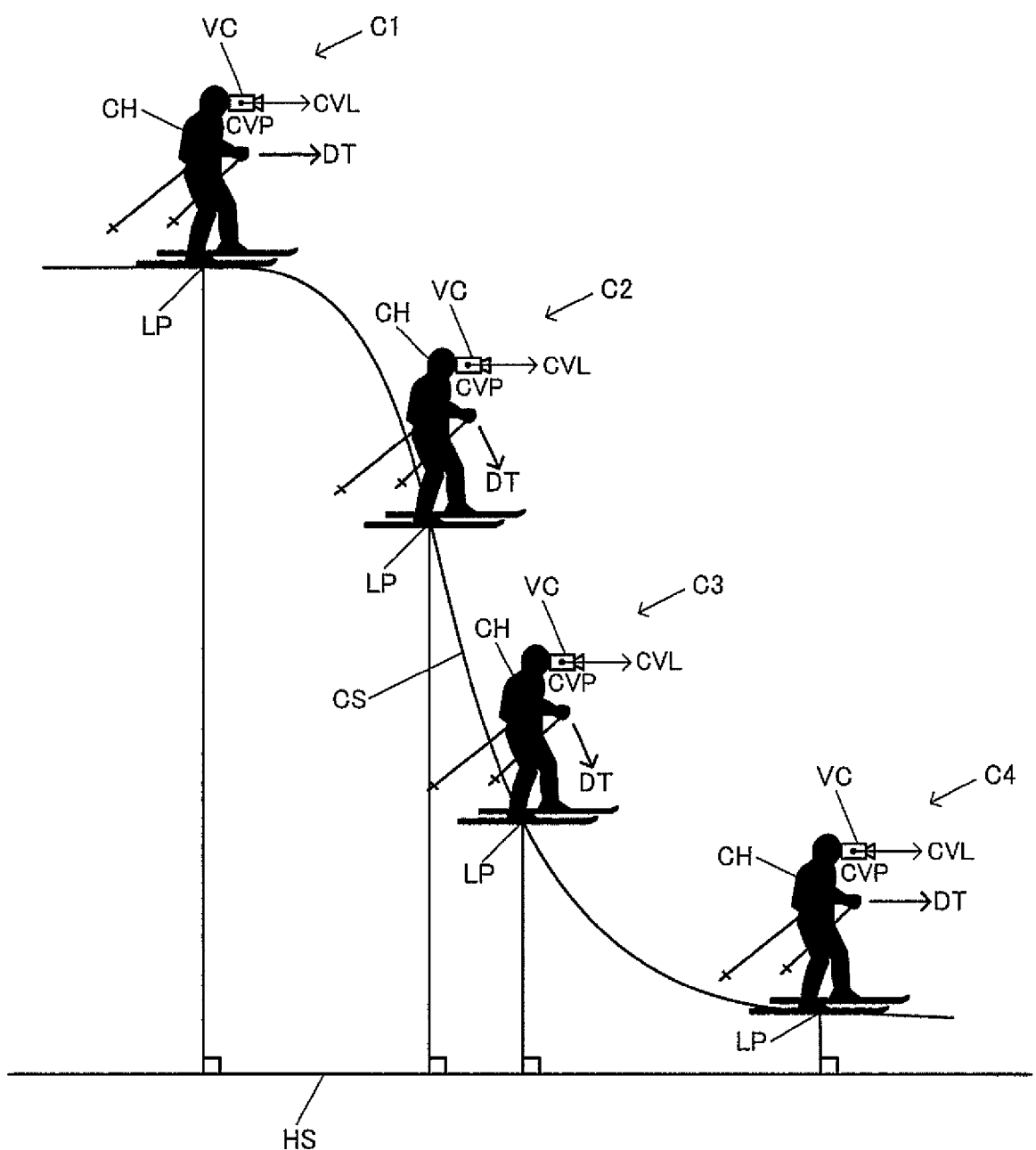
FIG. 13 is a diagram illustrating a first implementation method for the process of disabling the orientation change of the virtual camera.

In FIG. 13, as illustrated in C1 to C4, a process of moving the character CH is performed while disabling (or limiting) the orientation change of the character CH corresponding to at least one of the pitching and rolling in a case where the traveling direction DT of the character CH (moving body) changes. The virtual camera VC is set at the point-of-view position of the character CH for which the orientation change is disabled (or limited). In other worlds, when the character CH (virtual user) corresponding to the user moves in the virtual space, his or her line-of-sight direction is calculated by being converted into a point-of-view coordinate system of a basic model (basic posture), in which the reference coordinates (foot position LP) is common to that of the character CH and a body axis (Y axis) is orthogonal to the horizontal plane HS (reference plane) of the world coordinate system, whereby the 3D sickness is prevented.

For example, in FIG. 8, the orientation change of the character CH corresponding to the pitching occurs in accordance with the status (inclination) of the course CS. For example, on the downhill course CS, the orientation change corresponding to the forward pitching of the character CH occurs. Thus, the orientation change resulting in a pitch angle that is a depression angle relative to the horizontal direction occurs. On the uphill course CS, an orientation change corresponding to backward pitching of the character CH occurs. Thus, the orientation change resulting in a pitch angle that is an elevation angle relative to the horizontal direction occurs.

On the other hand, in FIG. 13, as illustrated in C1 to C4, the orientation change of the character CH corresponding to the pitching does not occur even when the traveling direction DT of the character CH changes. For example, the posture of the character CH is set (fixed) with a right angle (approximately right angle) formed between the body axis (line connecting the head and the feet) of the character CH and the horizontal plane HS of the world coordinate system. For example, the character CH taking a basic posture (upright posture) is arranged at the foot position LP (reference coordinates) of the character CH. Even when the traveling direction DT of the character CH changes, the character CH travels on the course CS while still taking the basic posture (upright posture). For example, when height information about the course at each point is set as the course information, the character CH is moved only with reference to this height information set as the course information. Only the height of the foot position LP as the reference position is changed without changing the posture of the character CH for example. The course CS illustrated in FIG. 13 is a downhill course, and thus the traveling by the character CH on the course CS involves a change in the height of the character CH (foot position LP) only, and involves no orientation change of the character CH.

Similarly, even in a situation where the orientation change corresponding to rolling may occur due to the right or left cornering as described with reference to FIG. 12, the orientation change corresponding to rolling of the character CH does not occur. Thus, even when the traveling direction DT changes due to the cornering, the character CH travels on the course CS while maintaining the basic posture (standing posture) as illustrated in FIG. 13, with no orientation change corresponding to rolling as illustrated in FIG. 12.

The point-of-view position CVP of the virtual camera VC is set to be at the point-of-view (point-of-view coordinate system) position of the character CH taking the basic posture described above. The line-of-sight direction CVL of the virtual camera VC is in parallel with the horizontal plane HS. For example, the orientation of the character CH is maintained to be that with the basic posture, and thus the point-of-view position of the character CH relative to the foot position LP is fixed, and the point-of-view position CVP of the virtual camera VC is set to be at this fixed position. The basic posture of the character CH is the upright posture, and the line-of-sight direction CVL of the virtual camera VC is orthogonal (substantially orthogonal) to the body axis of the character CH.

Actually, the character CH is a skier and thus its basic posture is slightly tilted forward. Thus, the angle between the body axis of the character CH and the horizontal plane HS is slightly smaller than 90°, and the angle between the body axis of the character CH and the line-of-sight direction CVL of the virtual camera VC is slightly larger than 90°.

As described above, in FIG. 13, even when the traveling direction DT changes, the character CH travels on the course CS while maintaining the basic posture (upright posture, forward tilted posture), with no orientation change corresponding to pitching and/or rolling. With the virtual camera VC set to be at the point-of-view position of the character CH maintaining such a basic posture, the orientation control for the virtual camera VC as illustrated in FIG. 11 can be implemented. Specifically, the orientation control can be performed so that the pitching and/or the rolling of the virtual camera VC does not occur in response to a change in the traveling direction DT.

Figure 14:
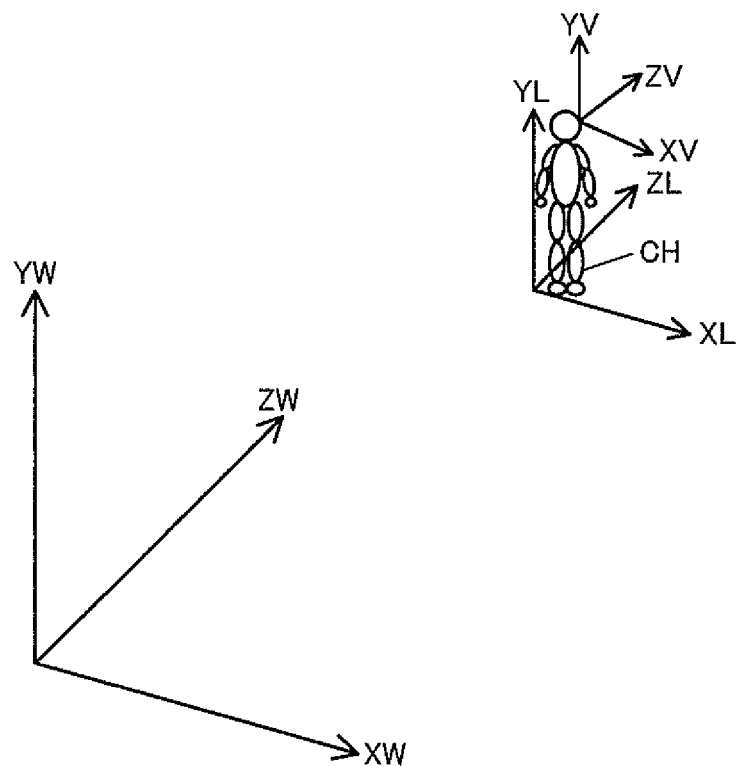
FIG. 14 is a diagram illustrating a method of setting a world coordinate system, a local coordinate system, and a point-of-view coordinate system.

FIG. 14 is a diagram illustrating relationship among the world coordinate system (XW,YW,ZW) that is a coordinate system of the virtual world, the local coordinate system (XL,YL,ZL) that is a coordinate system local to the character CH, and the point-of-view coordinate system (XV,YV,ZV) that is a coordinate system of the virtual camera. In the present embodiment, a process of moving the reference position (origin position, foot position) of the local coordinate system (XL,YL,ZL) for the character CH (moving body) is performed, in the world coordinate system (XW,YW,ZW) in FIG. 14. The local coordinate system is set to disable or limit rotational movement corresponding to at least one of pitching and rolling of the local coordinate system relative to the world coordinate system. The point-of-view coordinate system for the virtual camera is set to be at the point-of-view position of the character CH in the local coordinate system. For example, in a rendering process of generating an image as viewed from the virtual camera, a coordinate conversion process (geometry process) is performed under the setting of the coordinate systems as illustrated in FIG. 14. Thus, the method illustrated in FIG. 13 can be implemented.

When the character CH travels on the course CS while maintaining the basic posture as illustrated in FIG. 13, an unnatural image might be generated regarding an image of the ski board in contact with the course CS for example. In the first person point-of-view image in FIG. 5, an image of the ski boards is displayed when the user looks down for example, and thus an unnatural image of the ski boards is not desirable.

Thus, in the present embodiment, the process of moving the character CH on the course CS is performed while disabling (or limiting) the orientation change corresponding to the pitching, rolling, and the like in response to a change in the traveling direction of the character CH (moving body) due to a change in the status (such as the shape) of the course CS in the virtual space, but the orientation is changed for a given object accompanying the character CH in accordance with the status (such as inclination, undulation, and bumpiness) of the course CS.

Figure 15:
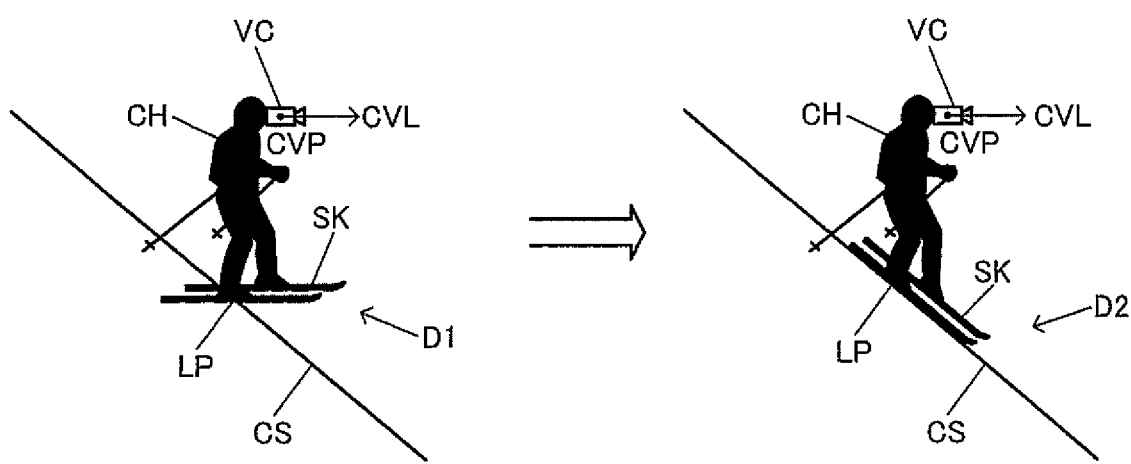
FIG. 15 is a diagram illustrating a method of controlling an orientation of an accompanying object.

For example, in D1 in FIG. 15, a ski board SK as the accompanying object has its longer side being orthogonal to the body axis of the character CH taking the basic posture. Thus, the ski boards SK do not appropriately come into contact with the downhill course CS, resulting in an unnatural image.

Thus, in the present embodiment, as illustrated in D2 in FIG. 15, the orientation of the ski boards SK as the accompanying object of the character CH is changed in accordance with the status of the course CS. For example, the ski boards SK as the object has the orientation changed to be in parallel with the surface (contact surface) of the course CS. For example, angle information about inclination of the course is acquired from the course information, and the ski board SK as the object is disposed at the foot position LP of the character CH to be in parallel with the course inclined. Thus, an image with the ski boards SK constantly in appropriate contact with the course CS is displayed, so as not to provide an unnatural impression to the user.

The object for which the orientation is changed in accordance with the status of the course is not limited to the ski boards as illustrated in FIG. 15, and various other objects may be contemplated. For example, it may be a body part of the character such as a foot or a hand, or may be a part of the moving body, such as a robot, combing into contact with the course. For example, the part to be in contact with the course in the virtual space has the orientation changed in accordance with the status of the course as in the case of the ski boards in FIG. 14. The course may not necessarily have its area clearly divided as in a course in a driving game, and may be any course (a course in an RPG for example) scheduled to be an area in which the moving body moves in a map of the virtual space.

In the present embodiment, for the competition image, observation image or demo image, an image may be generated to display a second moving body for which the orientation change corresponding to at least one of the pitching and rolling is not disabled or limited.

Figure 16:
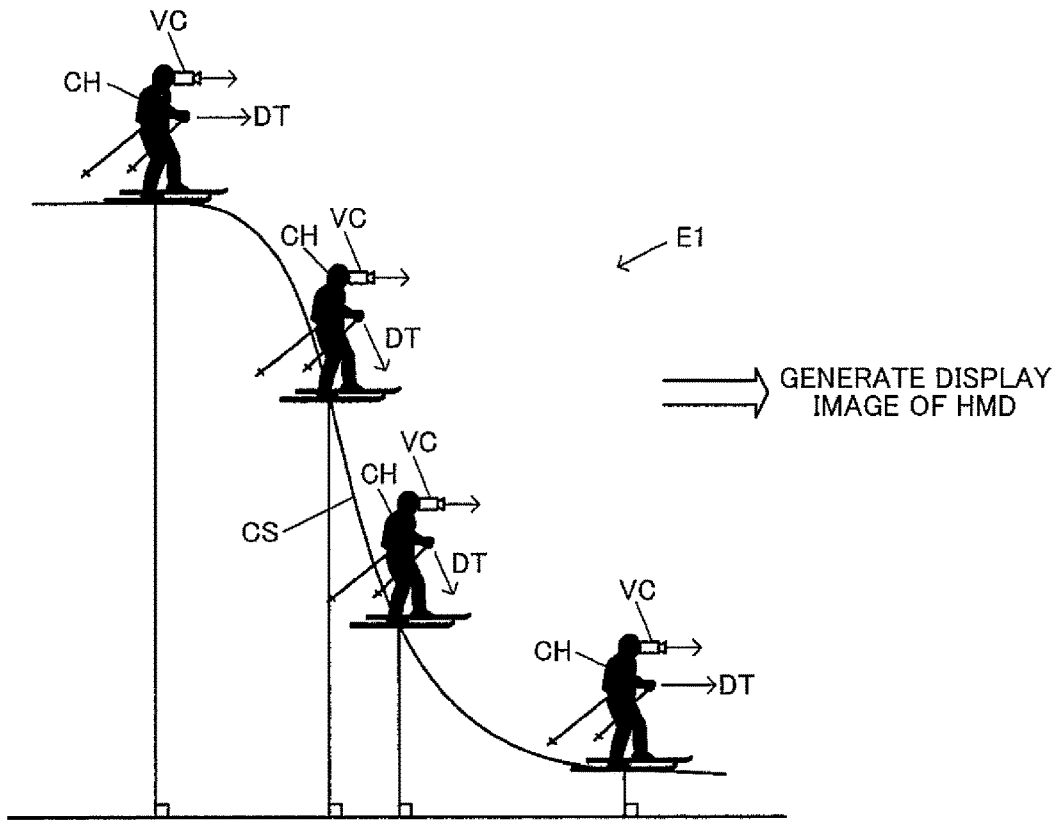
FIG. 16 is a diagram illustrating a method of generating a competition image, an observation image, and a demo image.
Figure 16:
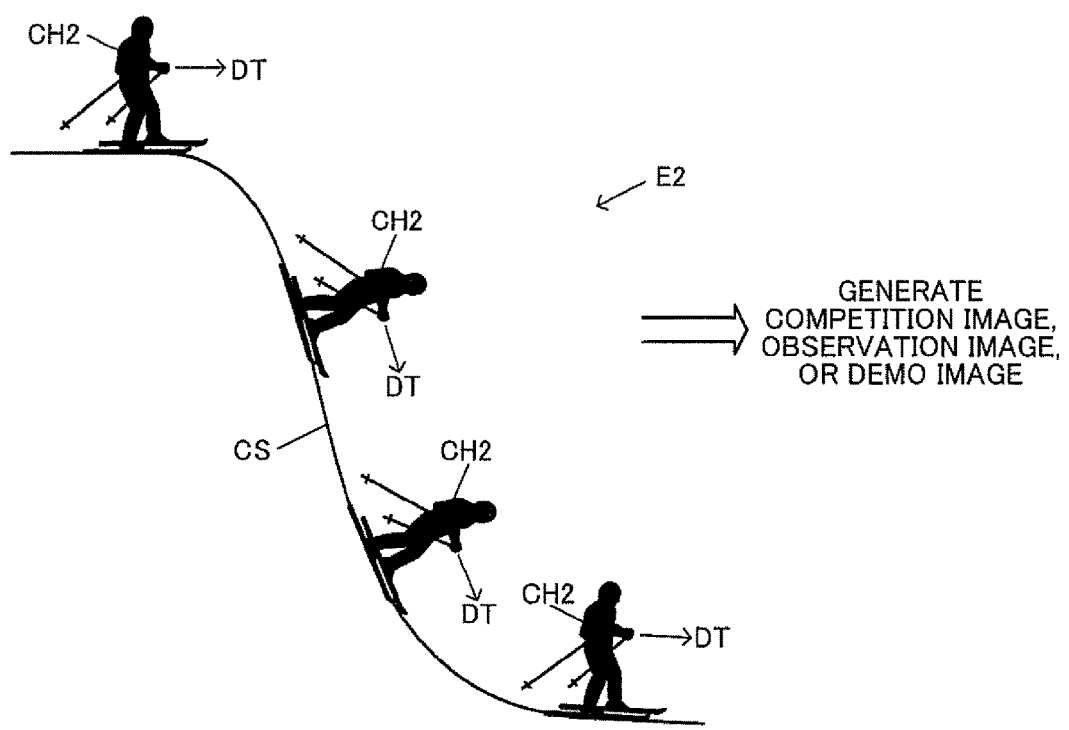

For example, in E1 in FIG. 16, the character CH is moved with orientation change of the character CH corresponding to pitching and/or rolling in response to a change in the traveling direction DT of the character CH disabled (or with the orientation change limited) as described above with reference to FIG. 13. Then, a display image using the character CH as illustrated in E1 in FIG. 16 is generated and displayed on the HMD of the user. Thus, the display image on the HMD is prevented from being largely or massively shaken, whereby the 3D sickness can be prevented.

On the other hand, in E2 in FIG. 16, an image is generated by using a character CH2 (a second moving body in a broad sense) for which orientation change corresponding to pitching and/or rolling occurs in accordance with a change in the traveling direction DT as in FIG. 8. For example, for the character CH2, orientation change corresponding to forward pitching is performed on the downhill course CS, and orientation change corresponding to backward pitching is performed on the uphill course CS. Furthermore, for the character CH2, orientation change corresponding to rolling as illustrated in FIG. 12 is performed when making a right or left turn. The competition image, the observation image, or the demo image is generated by using such a character CH2. For example, the competition image is an image displayed on an HMD of the opponent user and the like. The observation image is an image for audiences and the like for example to observe (watch) a game (such as competition) involving the character of the user. The demo image is an image displayed in a demonstration mode before and/or after the game or at the other like timing and is a playback image showing the past gameplay by the user for example.

The opponent user, audiences, or the like would feel that such a competition image, observation image or demo image is unnatural if the character CH maintaining the basic posture as in E1 in FIG. 16 is used for generating such an image.

In view of this, in the method in FIG. 16, the display image on the HMD is generated by using the character CH traveling and maintaining the basic posture as in E1 in FIG. 16 so that the display image is prevented from being shaken, whereby the 3D sickness can be prevented. On the other hand, the competition image, the observation image, or the demo image is generated by using the character CH2 that posture of which appropriately changes in accordance with the traveling direction DT as in E2 in FIG. 16, and thus can be generated as an appropriate image free of unnatural impression. Thus, prevention of 3D sickness and generation of an appropriate competition image, observation image, or demo image can both be achieved.

Figure 17A:
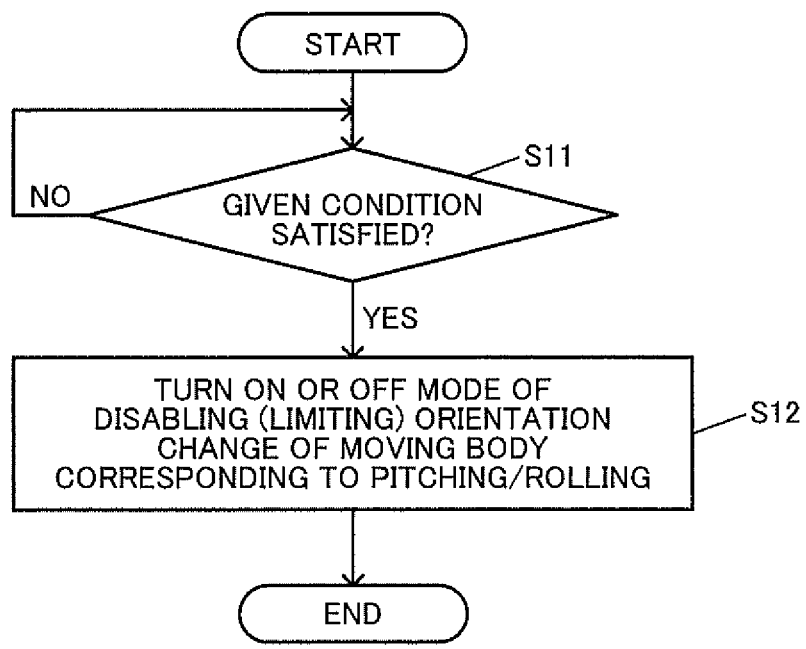
FIG. 17A and FIG. 17B are diagrams illustrating a method of setting the process of disabling the orientation change of the moving body to be ON or OFF.

The present embodiment may employ a method of turning ON or OFF the process (mode) of disabling or limiting the orientation change of the moving body corresponding to at least one of the pitching and rolling as in FIG. 13 in accordance with whether or not a given condition is satisfied. FIG. 17A is a flowchart illustrating such a method. First of all, whether or not the given condition is satisfied to disable (limit) the orientation change of the moving body (such as a character or a ridden moving body) corresponding to pitching and/or rolling is determined (step S11). When the given condition is satisfied, the mode of disabling (limiting) the orientation change of the moving body corresponding to pitching and/or rolling is turned ON or OFF (step S12). This given condition may be a condition for turning ON the mode, or a condition for turning OFF the mode. At least one of pitching and rolling of the moving body may be turned ON or OFF.

Figure 17B:
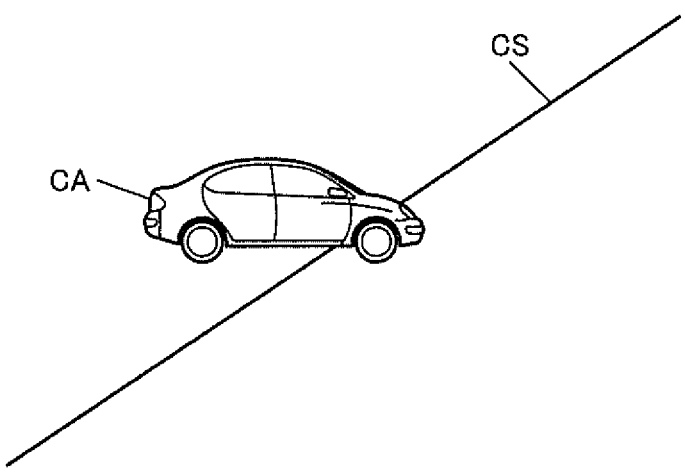

For example, in FIG. 17B, the moving body is a car CA climbing a steep slope course CS. If the orientation change of the car CA corresponding to the pitching is disabled in such a situation, an unnatural image with the hood of the car CA buried in the course CS might be generated for example. Thus, in such a situation, the given condition is determined to be satisfied, so that the mode of disabling the orientation change of the car CA corresponding to the pitching is turned OFF. Thus, the orientation of the car CA conforms to the inclination of the course CS, whereby the unnatural image as illustrated in FIG. 17B can be prevented from being generated.

Various conditions may be contemplated as the given condition in step S11 in FIG. 17A. For example, when the course (movement surface) is a downhill, or a horizontal course with a special shape such as bumps, the given condition is determined to be satisfied, so that the disabling mode (or the limiting mode, the same applies to the following description) is turned ON to disable the orientation change of the moving body corresponding to pitching and/or rolling. Then, when the course turns into an uphill with a predetermined inclination angle or more as illustrated in FIG. 17B for example, the disabling mode is turned OFF. Alternatively, the disabling mode may be turned OFF when the course (movement surface) is horizontal or close to horizontal. Thus, the process of disabling or limiting the orientation change of the moving body corresponding to at least one of the pitching and rolling is set to be turned ON or OFF in accordance with the status of the course on which the moving body moves in the virtual space. Thus, the disabling mode can be set to be ON for preventing the 3D sickness when necessary, and can be set to be OFF under the status not requiring the disabling mode.

The disabling mode may be turned ON or OFF based on information set by the user on the option setting screen or based on the play history information about the user, as in FIG. 21 and FIG. 22 described later. Thus, the disabling mode can be set to be ON or OFF based on the intention of the user or the past play status of the user.

Figure 18:
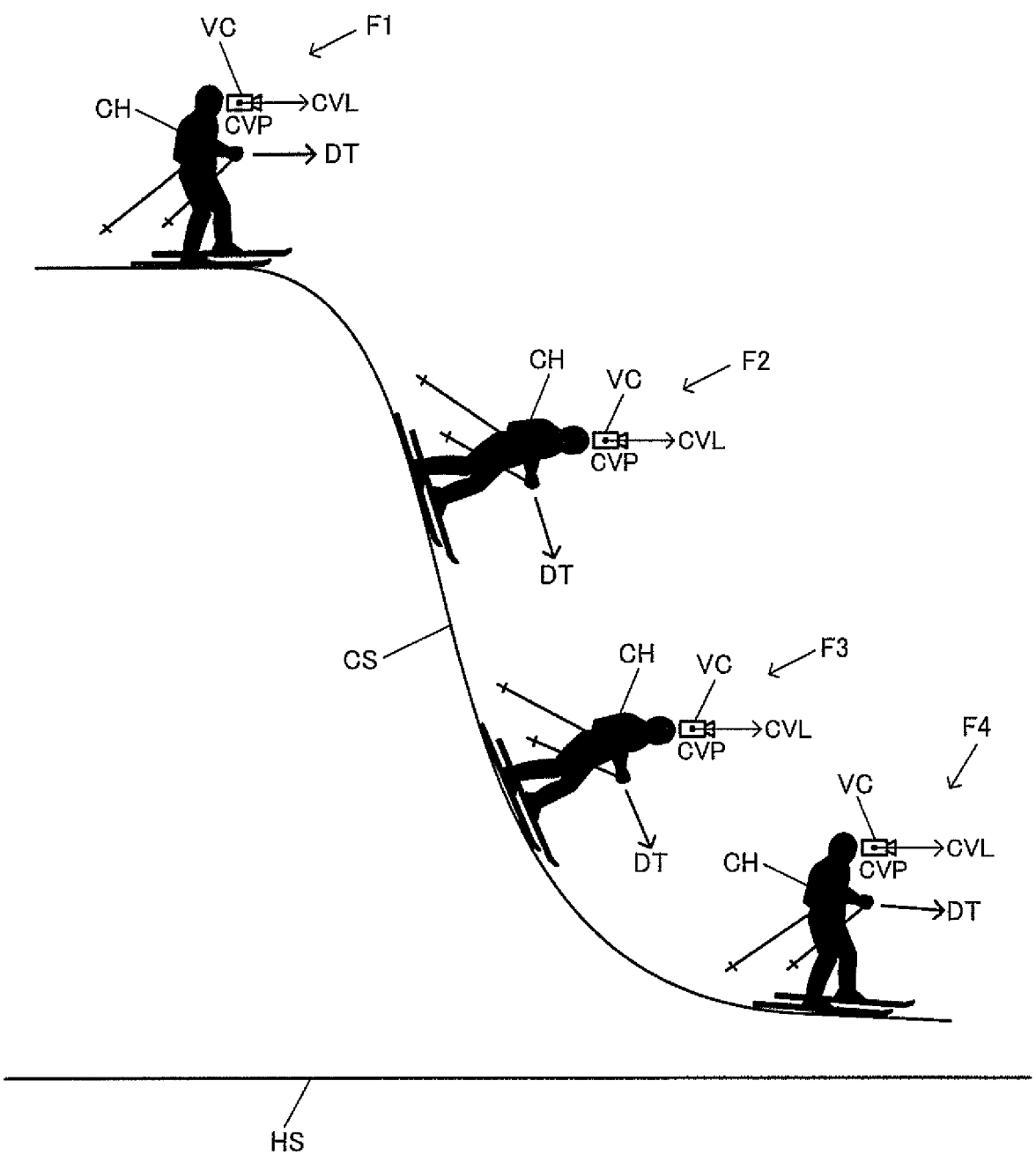
FIG. 18 is a diagram illustrating a second implementation method for the process of disabling the orientation change of the virtual camera.

FIG. 18 is a diagram illustrating a second implantation method for the disabling process (limiting process) for the orientation change corresponding to the pitching and/or rolling of the virtual camera.

In F1 to F4 in FIG. 18, a process of moving the character CH (moving body) so that the orientation of the character CH changes is performed in accordance with a change in the traveling direction DT of the character CH. For example, on the downhill course CS, an orientation change corresponding to forward pitching of the character CH occurs. On the uphill course CS, an orientation change corresponding to backward pitching of the character CH occurs. Orientation change corresponding to rolling occurs when the moving object turns right or left.

In F1 to F4 in FIG. 18, the virtual camera VC is set to disable (limit) the orientation change of the virtual camera VC corresponding to the pitching and/or rolling in a case where the orientation of the character CH changes due to such a change in the traveling direction DT.

For example, the course CS in F2 and F3 in FIG. 18 is a downhill, and thus the traveling direction DT is in a downward direction. Thus, the orientation change corresponding to the forward pitching is performed on the character CH. However, the line-of-sight direction CVL of the virtual camera VC is in the horizontal direction and thus is different from the traveling direction DT.

Thus, even when the traveling direction of the character CH changes in accordance with the status of the course CS and the like, the line-of-sight direction CVL of the virtual camera VC stays to be in a predetermined direction (horizontal direction) unless the user moves his or her head or makes the other like actions. Thus, the display image on the HMD can be prevented from being largely or massively shaken, whereby the 3D sickness can be prevented. The second implementation method in FIG. 18 is different from the first implementation method in FIG. 13 in that the orientation of the character CH changes in accordance with the traveling direction DT. For example, the orientation changes to be directed downward on the downhill course CS, and changes to be directed upward on the uphill course CS. At the time of cornering, the orientation changes with rolling with which the body axis is inclined rightward or leftward as illustrated in FIG. 12. Thus, an image the opponent user, audiences, and the like do not feel unnatural can be displayed as the competition image, observation image or demo image in E2 in FIG. 16. Thus, the prevention of 3D sickness due to the shaking of the display image on the HMD and generation of an appropriate competition image, observation image, or demo image can both be achieved.

When the method in FIG. 18 is performed, the orientation of the character CH (moving body) may be set with reference to at least one of the position and the orientation of the virtual camera VC.

Figure 19A:
FIG. 19A and FIG. 19B are diagrams illustrating a method of setting the orientation of the moving body with reference to the position and/or the orientation of the virtual camera.
Figure 19B:
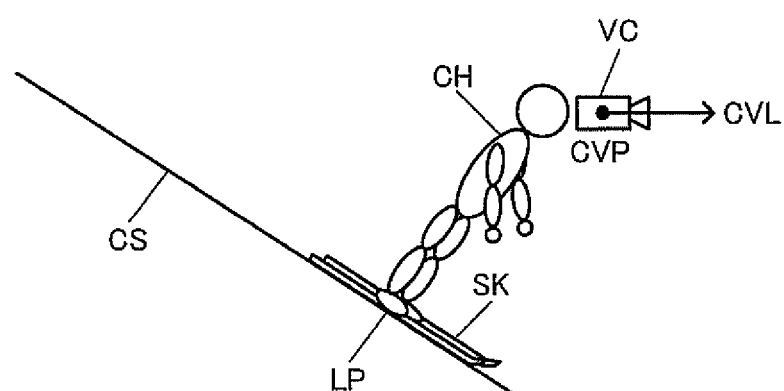

As illustrated in FIG. 19A for example, it is assumed that the position and/or the orientation (point-of-view position CVP and/or line-of-sight direction CVL) of the virtual camera VC is set to disable the orientation change corresponding to the pitching and rolling in response to a change in the traveling direction DT of the character CH. In this case, as illustrated in FIG. 19B, the orientation of the character CH is set with reference to the position and/or the orientation of the virtual camera set as illustrated in FIG. 19A. For example, the orientation of the character CH is set so that the position of the virtual camera VC matches the point-of-view position of the character CH and the foot position LP of the character CH is in contact with the course CS. For example, the orientation of the character CH (forward tilted orientation) is set so that the object as the ski boards SK is appropriate in contact with the movement surface of the course CS.

The orientation of the character CH can be set in such a manner through an inverse kinematics process in the motion process and the like for example. For example, the inverse kinematics process is performed to obtain the position of each joint and each bone, so that the position of the head (point-of-view position) is set at the position of the virtual camera VC, and the foot position is set to be at the foot position LP in contact with the course CS, in motion data (skeleton data) about the character CH. In this process, the direction of the ski boards SK (longitudinal direction) is set to be along the direction of the movement surface of the course CS. Thus, the process as illustrated in FIG. 18 can be implemented. Specifically, the orientation of the character CH can be set to be appropriate in accordance with the inclination, the shape, and the like of the course CS, with no orientation change of the virtual camera VC corresponding to the pitching and/or rolling occurring in response to a change in the traveling direction DT.

Figure 20:
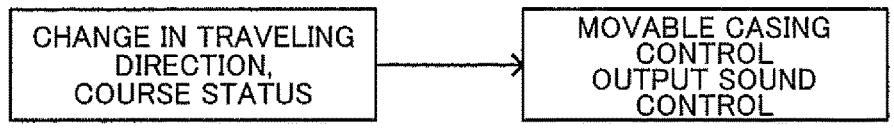
FIG. 20 is a diagram illustrating a method of controlling a movable casing and/or output sound.

In the present embodiment, as illustrated in FIG. 20, the movable casing 40 described with reference to FIG. 4, FIG. 6, and the like may change the play position of the user in accordance with a change in the traveling direction of the moving body (such as a character) or the status (condition) of the course on which the moving body moves. Alternatively, sound corresponding to a change in the traveling direction of the moving body or output sound corresponding to the status of the course on which the moving body moves may be generated.

For example, when the traveling direction of the moving body (such as a character) in the virtual space is directed downward on a downhill course, the movable casing 40 is controlled so that the orientation of the user in the real space is pitched forward. In an example illustrated in FIG. 4, the rear air spring sections 50 and 52 are extended, whereas the front air spring sections 51 and 53 are contracted. Furthermore, output sound (for example, wind sound) is output to make the user feel that he or she is moving down the downhill course for example. When the traveling direction of the moving body in the virtual space is directed upward on an uphill course, the movable casing 40 is controlled to implement backward pitching for the orientation of the user in the real space. In an example illustrated in FIG. 4, the rear air spring sections 50 and 52 are contracted, whereas the front air spring sections 51 and 53 are extended. For example, output sound that makes the user feel that he or she is climbing the uphill course is output.

If the course is a bumpy road with bumps, the movable casing 40 is controlled so that the play position of the user is vertically shaken. In the example illustrated in FIG. 4, the air spring sections 50 to 52 are vertically extended and contracted with small strokes. Furthermore, output sound indicating the bumpy road is output.

With the movable casing 40 and the output sound thus controlled, a change in the traveling direction of the moving body in the virtual space and/or the status of the course can be felt by the user using the movable casing 40 and/or the output sound. For example, a change in the traveling direction, a change in acceleration due to course status, and/or the like can be felt by a change in the play position by using the movable casing 40 or can be aurally recognized by a change in the output sound. Thus, the feeling and hearing status of the user in the real world somewhat matches the status of the moving body and the course in the virtual world, so that a risk of the user having 3D sickness can be reduced. For example, a massive change in the traveling direction of the moving body and/or the course status in the virtual space with no change in the play position achieved by using the movable casing 40 and/or in the output sound results in mismatch between the feeling and hearing status of the user and the status of the virtual space. Such a situation, which may result in 3D sickness, can be prevented by the method according to the present embodiment illustrated in FIG. 20.

In the present embodiment, the disabling process (or the limiting process) for the orientation change (pitching, rolling) of the virtual camera may be set to be ON or OFF based on the information set by the user or play history information about the user.

Figure 21:
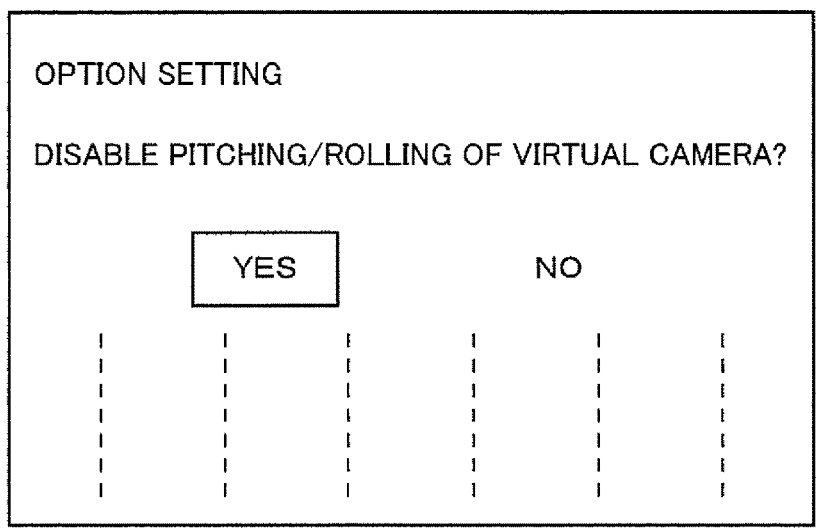
FIG. 21 is a diagram illustrating a method of turning ON or OFF the process of disabling the orientation change of the virtual camera based on information set by the user.

For example, FIG. 21 illustrates an example of an option setting screen used by the user for setting various options for a game. On the option setting screen, the user can select the disabling process (disabling setting) for pitching and/or rolling of the virtual camera to be ON or OFF. Thus, the user who is less likely to have 3D sickness can set the disabling process for pitching and/or rolling of the virtual camera to be OFF to enjoy the game with a virtual camera setting achieving higher reality. On the other hand, the user who is likely to have 3D sickness can set the disabling process to be ON to effectively prevent the 3D sickness.

Figure 22:
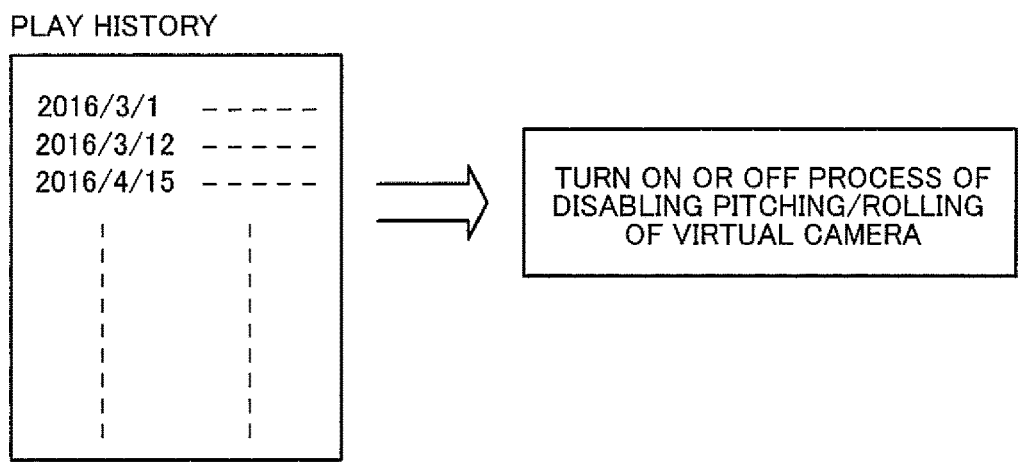
FIG. 22 is a diagram illustrating a method of turning ON or OFF the process of disabling the orientation change of the virtual camera based on play history.

In FIG. 22, the disabling process for pitching and/or rolling of the virtual camera is set to be ON or OFF based on information about a play history of the user. For example, the disabling process is automatically turned ON for the user who is determined to be likely to turn ON the disabling process on the option setting screen in FIG. 21 and the like, based on the play history information about the user. The disabling process is automatically turned OFF for the user who is determined to be likely to turn OFF the disabling process on the option setting screen, based on the play history information about the user. Alternatively, the user determined to be a frequent player of the game based on the play history information is determined to be less likely to have 3D sickness because he or she is used to playing the game, and thus the disabling process may be set to be OFF. The play history information is stored in the portable information storage medium 195 (such as an IC card) in FIG. 1 for example, and the disabling process is set to be ON or OFF based on the play history information in the portable information storage medium 195. Alternatively, the play history information about the user may be downloaded from an external server.

When the process of limiting the pitching and/or rolling of the virtual camera is performed, the level of the limiting process may be set based on the information set by the user or the play history information about the user. For example, the level of the limiting level may be settable by the user on the option setting screen in FIG. 21, or the level of the limiting process may be raised or lowered based on the play history information about the user. The level of the limiting process indicates a level of change in the pitch angle and/or the rolling angle of the virtual camera, in response to a change in the traveling direction of the moving body for example. For example, for a beginner level user and a user who is unfamiliar with the game, the level of change in the pitch angle and/or the rolling angle of the virtual camera in response to a change in the traveling direction of the moving body is set to be lower (or to zero). For an advanced level user and a user who is used to playing the game, the level of change in the pitch angle and/or the rolling angle of the virtual camera in response to a change in the traveling direction of the moving body is set to be higher (or to one). Thus, an optimum process level can be set in accordance with the user.

4.3 Process Example

Figure 23:
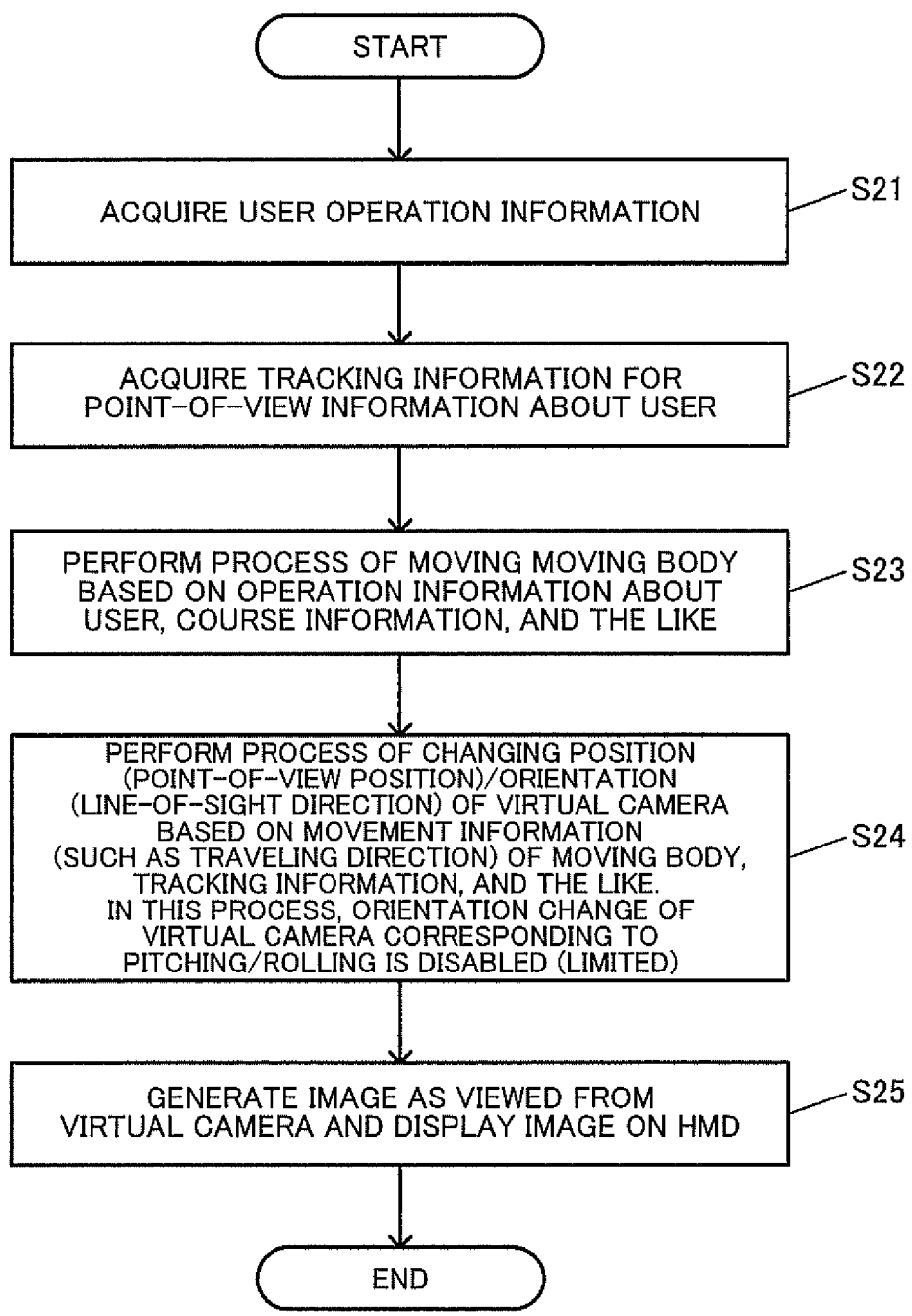
FIG. 23 is a flowchart illustrating a detailed process example according to the present embodiment.

Next, an example of the process according to the present embodiment is described with reference to a flowchart in FIG. 23.

First of all, operation information about the user is acquired (step S21). For example, the operation information about the user input through the operation section 160 in FIG. 1 is acquired. Then, tracking information for the point-of-view information about the user is acquired (step S22). For example, the tracking information obtained through the tracking process described with reference to FIG. 2A to FIG. 3B is acquired.

Then, a process of moving the moving body based on the operation information about the user, the course information, and the like is performed (step S23). For example, a process of moving the moving body such as a character on a course defined by the course information is performed based on the operation information about the user. Next, a process of changing the position (point-of-view position) and/or the orientation (line-of-sight direction) of the virtual camera is performed based on the movement information (such as a traveling direction) of the moving body, the tracking information acquired in step S22, and/or the like (step S24). For example, the position of the virtual camera and the like is changed to follow the movement of the moving body. For example, the position of the virtual camera is set to be at the point-of-view position of the character that is the moving body. As described above with reference to FIG. 9A to FIG. 9C, a process of changing the position and/or the orientation of the virtual camera in accordance with the point-of-view position and/or the line-of-sight direction of the user is performed based on the tracking information. In this process, as described above with reference to FIG. 11 to FIG. 18 and the like, the orientation change corresponding to pitching and/or rolling of the virtual camera is disabled (limited). Next, an image as viewed from a virtual camera thus set is generated and is displayed on the HMD (step S25). Specifically, an image as illustrated in FIG. 5 or FIG. 7 is generated to be displayed on the HMD.

Although the present embodiment has been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each the terms (such as a character or an air spring section) that are at least once written together with a term (such as a moving body or an extension/contraction section) of a wider sense or an alternative term in the specification or the figures can be replaced with the alternative term at any part of the specification or the figures. The process of acquiring the tracking information, the process of moving the moving body, the process of controlling (process of setting) the virtual camera, the process of displaying a display image of the HMD, the process of controlling the orientation of the moving body, and the like are not limited to those described in the present embodiment, and methods, processes, and configurations equivalent thereto are included in the scope of the disclosure. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising a processor including hardware, the processor being configured to perform:
    an input process that acquires tracking information including tracking information for point-of-view information about a user of a head mounted display worn by the user;
    a moving body process that moves a moving body in a virtual space, which corresponds to the user;
    a virtual camera control process that controls a virtual camera within the virtual space, the virtual camera being set as a first person point-of-view of the user, the virtual camera being set to be at a position corresponding to a point-of-view of the moving body in the virtual space, and when the moving body moves in the virtual space, the position of the virtual camera changes to follow the movement of the moving body; and
    a display process of generating an image as viewed from the virtual camera in the virtual space, the generated virtual image being a display image displayed on the head mounted display to the user,
        wherein in the virtual camera control process, the processor is configured to perform setting the virtual camera so that a position and an orientation of the virtual camera is changed based on the tracking information, while orientation change of the virtual camera corresponding to at least one of pitching and rolling is disabled or limited in a case where a traveling direction of the moving body corresponds to at least one of the pitching and the rolling changes.

2. The simulation system as defined in claim 1, wherein in the input process, the processor acquires the tracking information obtained through a tracking process on the head mounted display, the tracking information including change information indicating a change in the point-of-view information from initial point-of-view information of the user.

3. The simulation system as defined in claim 1, wherein:
    in the moving body process, the processor performs a process of moving the moving body while disabling or limiting the orientation change of the moving body corresponding to at least one of the pitching and rolling in a case where a traveling direction of the moving body changes, and
    in the virtual camera control process, the processor sets the virtual camera at the point-of-view of the moving body for which the orientation change is disabled or limited.

4. The simulation system as defined in claim 3, wherein a process of moving a reference position of a local coordinate system for the moving body in a world coordinate system is performed, the local coordinate system is set so that rotational movement of the local coordinate system corresponding to at least one of pitching and rolling with respect to the world coordinate system is disabled or limited, and a point-of-view coordinate system for the virtual camera is set at the point-of-view position of the moving body in the local coordinate system.

5. The simulation system as defined in claim 3, wherein in the moving body process, the processor moves the moving body on a course while disabling or limiting the change in the orientation of the moving body corresponding to at least one of the pitching and rolling in a case where the traveling direction of the moving body, which changes due to a change in a status of the course in the virtual space, while changing an orientation of a given object accompanying the moving body in accordance with the status of the course.

6. The simulation system as defined in claim 3, wherein in the display process, the processor generates, for a competition image, an observation image, or a demo image, an image displaying a second moving body for which the change in orientation corresponding to at least one of the pitching and rolling is not disabled or limited.

7. The simulation system as defined in claim 3, wherein in the virtual camera control process, the processor turns ON or OFF a process of disabling or limiting the change in orientation of the moving body corresponding to at least one of the pitching and rolling in accordance with whether a given condition is satisfied.

8. The simulation system as defined in claim 7, wherein in the virtual camera control process, the processor turns ON or OFF a process of disabling or limiting the change in the orientation of the moving body corresponding to at least one of the pitching and rolling in accordance with a status of a course on which the moving body moves in the virtual space.

9. The simulation system as defined in claim 1, wherein:
    in the moving body process, the processor moves the moving body so that the orientation of the moving body changes in accordance with a change in the traveling direction of the moving body, and
    in the virtual camera control process, the processor sets the virtual camera to disable or limit the change in the orientation of the virtual camera corresponding to at least one of the pitching and rolling in a case where the orientation of the moving body changes in accordance with a change in the traveling direction of the moving body.

10. The simulation system as defined in claim 9, wherein in the moving body process, the processor sets the orientation of the moving body with reference to at least one of the position and the orientation of the virtual camera.

11. The simulation system as defined in claim 1, further comprising a movable casing that changes a play position of the user in accordance with a change in the traveling direction of the moving body or in accordance with a status of a course on which the moving body moves.

12. The simulation system as defined in claim 1, wherein the processor is configured to perform a sound process of generating sound corresponding to a change in the traveling direction of the moving body or generating output sound corresponding to a status of a course on which the moving body moves.

13. The simulation system as defined in claim 1, wherein in the virtual camera control process, the processor performs sets the process of disabling or limiting the change in the orientation of the virtual camera to be ON or OFF based on information set by the user or play history information about the user.

14. The simulation system as defined in claim 1, wherein in the virtual camera control process, the change in the orientation of the virtual camera corresponding to yawing is not disabled or limited in a case where the traveling direction of the moving body corresponding to yawing changes.

15. A simulation system comprising a processor including hardware, the processor being configured to perform:
a moving body process that moves a moving body in a virtual space, which corresponds to the user;
a virtual camera control process that controls a virtual camera within the virtual space, the virtual camera being set as a first person point-of-view of the user, the virtual camera being set to be at a position corresponding to a point-of-view of the moving body in the virtual space, and when the moving body moves in the virtual space, the position of the virtual camera changes to follow the movement of the moving body; and
a display process of generating an image as viewed from the virtual camera in the virtual space, the generated virtual image being a display image displayed on a head mounted display to the user, wherein:
in the moving body process, the processor moves the moving body while disabling or limiting a change in orientation of the moving body in accordance with an orientation change of the virtual camera corresponding to at least one of pitching and rolling is disabled or limited in a case where a traveling direction of the moving body corresponds to at least one of the pitching and the rolling changes, and
in the virtual camera control process, the processor sets the virtual camera at the point-of-view position of the moving body for which the orientation change is disabled or limited.

16. The simulation system as defined in claim 15, wherein a process of moving a reference position of a local coordinate system for the moving body in a world coordinate system is performed, the local coordinate system is set so that rotational movement of the local coordinate system corresponding to at least one of pitching and rolling with respect to the world coordinate system is disabled or limited, and a point-of-view coordinate system for the virtual camera is set at the point-of-view position of the moving body in the local coordinate system.

17. The simulation system as defined in claim 15, wherein in the moving body process, the processor moves the moving body on a course while disabling or limiting the change in the orientation of the moving body corresponding to at least one of the pitching and rolling in a case where the traveling direction of the moving body, which changes due to a change in a status of the course in the virtual space, while changing an orientation of a given object accompanying the moving body in accordance with the status of the course.

18. The simulation system as defined in claim 15, wherein in the moving body process, the change of the orientation of the moving body corresponding to yawing is not disabled or limited when the moving body moves.

19. A processing method comprising:
performing an input process that acquires tracking information including tracking information for point-of-view information about a user of a head mounted display worn by the user;
performing a moving body process that moves a moving body in a virtual space, which corresponds to the user;
performing a virtual camera control process that controls a virtual camera within the virtual space, the virtual camera being set as a first person point-of-view of the user, the virtual camera being set to be at a position corresponding to a point-of-view of the moving body in the virtual space, and when the moving body moves in the virtual space, the position of the virtual camera changes to follow the movement of the moving body; and
performing a display process of generating an image as viewed from the virtual camera in the virtual space, the generated virtual image being a display image displayed on the head mounted to the user, wherein;
in the virtual camera control process, performing setting the virtual camera so that a position and an orientation of the virtual camera is changed based on the tracking information, while orientation change of the virtual camera corresponding to at least one of pitching and rolling is disabled or limited in a case where a traveling direction of the moving body corresponds to at least one of the pitching and the rolling changes.

20. A non-transitory computer-readable information storage medium storing a program for causing a computer to perform the processing method as defined in claim 19.

21. The processing method as defined in claim 19, wherein in the virtual camera control process, the change in the orientation of the virtual camera corresponding to yawing is not disabled or limited in a case where the traveling direction of the moving body corresponding to yawing changes.

22. A processing method comprising:
performing a moving body process that moves a moving body in a virtual space, which corresponds to a user;
performing a virtual camera control process that controls a virtual camera within the virtual space, the virtual camera being set as a first person point-of-view of the user, the virtual camera being set to be at a position corresponding to a point-of-view of the moving body in the virtual space, and when the moving body moves in the virtual space, the position of the virtual camera changes to follow the movement of the moving body; and
performing a display process of generating an image as viewed from the virtual camera in the virtual space, the generated virtual image being a display image displayed on the head mounted display to the user, wherein:

in the moving body process, performing a process of moving the moving body while disabling or limiting a change of an orientation of the moving body corresponding to at least one of pitching and rolling in a case where a traveling direction of the moving body changes, and in the virtual camera control process, performing setting the virtual camera at a point-of-view position of the moving body for which the change of the orientation is disabled or limited, while orientation change of the virtual camera corresponding to at least one of pitching and rolling is disabled or limited in a case where a traveling direction of the moving body corresponds to at least one of the pitching and the rolling changes.

23. A non-transitory computer-readable information storage medium storing a program for causing a computer to perform the processing method as defined in claim 22.

24. The processing method as defined in claim 22, wherein in the moving body process, the change in the orientation of the moving body corresponding to yawing is not disabled or limited when the moving body moves.

* * * * *

UNITED STATES PATENT AND TRADEMARK OFFICE
CERTIFICATE OF CORRECTION

PATENT NO. : 10,915,166 B2  
APPLICATION NO. : 16/245598  
DATED : February 9, 2021  
INVENTOR(S) : Yoshiaki Ishii et al.

Page 1 of 1

It is certified that error appears in the above-identified patent and that said Letters Patent is hereby corrected as shown below:

On the Title Page

Item (72), Inventors: Line 2, change "Making," to --Makino,--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*